(12) United States Patent
Fourman

(10) Patent No.: US 10,115,077 B2
(45) Date of Patent: Oct. 30, 2018

(54) SYSTEM FOR FACILITATING MANAGEMENT AND ORGANISATIONAL DEVELOPMENT PROCESSES

(75) Inventor: Clive Morel Fourman, London (GB)

(73) Assignee: Gaiasoft IP Limited, London (GB)

( * ) Notice: Subject to any disclaimer, the term of this patent is extended or adjusted under 35 U.S.C. 154(b) by 1772 days.

(21) Appl. No.: 10/561,502

(22) PCT Filed: Jun. 21, 2004

(86) PCT No.: PCT/GB2004/002627
§ 371 (c)(1),
(2), (4) Date: Dec. 19, 2005

(87) PCT Pub. No.: WO2004/114177
PCT Pub. Date: Dec. 29, 2004

(65) Prior Publication Data
US 2007/0055564 A1    Mar. 8, 2007

(30) Foreign Application Priority Data

Jun. 20, 2003 (GB) .................................. 0314440.9
Oct. 17, 2003 (GB) .................................. 0324346.6

(51) Int. Cl.
G06Q 10/00 (2012.01)
G06Q 10/10 (2012.01)
G06Q 10/06 (2012.01)

(52) U.S. Cl.
CPC ....... *G06Q 10/10* (2013.01); *G06Q 10/06393* (2013.01)

(58) Field of Classification Search
None
See application file for complete search history.

(56) References Cited

U.S. PATENT DOCUMENTS 5,179,587 A * 1/1993 Bock .................. H04Q 11/0407
                                                        379/93.02
6,424,979 B1 * 7/2002 Livingston ............. G06Q 10/06
                                                        707/999.202

(Continued)

FOREIGN PATENT DOCUMENTS

EP     1128299 A1   8/2001
WO     0229673 A1   4/2002

OTHER PUBLICATIONS

Kim, Young-Gul, Yu, Sung-Ho, and Lee, Jang-Hwan. Knowledge Strategy Planning: Methodology and Case. Korea Advance Institute of Science and Technology, Samsung SDS, Seoul, South Korea, Sep. 18, 2002. (Year: 2002).*

(Continued)

*Primary Examiner* — Stephanie Z Delich
(74) *Attorney, Agent, or Firm* — Finnegan, Henderson, Farabow, Garrett & Dunner LLP

(57) ABSTRACT

Business scorecard software provides management with traffic light displays to reflect strategy, objectives and targets. Typically, these systems focus on the Kaplan and Norton Balanced Scorecard and scorecarding of numbers. Search engines, knowledge retrieval systems and web portals use meta data to retrieve relevant information. The current invention provides a way to use the meta data inherent in an enhanced scorecard to enable focussed and efficient search and retrieval based on purpose or intent and thereby to create focussed purposeful web portals. Management expertise is the ability to achieve targets by implementing processes and developing appropriate climate and culture. The current invention provides a way to codify expertise and knowledge in relation to targets, process and culture as Process DNA, so that expertise can be captured and reused on-demand. Benefits include improved synergy (Continued)

across large organizational systems and increased likelihood of web portal users finding resources to support their intentions.

29 Claims, 21 Drawing Sheets

(56) References Cited

U.S. PATENT DOCUMENTS

| | | | |
|---|---|---|---|
| 6,668,253 B1* | 12/2003 | Thompson et al. | 707/10 |
| 6,697,820 B1* | 2/2004 | Tarlie | |
| 6,925,442 B1* | 8/2005 | Shapira | G06Q 10/0637 |
| | | | 705/14.66 |
| 7,546,246 B1* | 6/2009 | Stamm et al. | 705/7.37 |
| 2002/0007300 A1* | 1/2002 | Slatter | 705/9 |
| 2002/0035495 A1* | 3/2002 | Spira et al. | 705/7 |
| 2002/0178049 A1* | 11/2002 | Bye | 705/11 |
| 2003/0208429 A1* | 11/2003 | Bennett | 705/36 |
| 2004/0068429 A1* | 4/2004 | MacDonald | 705/10 |
| 2004/0138944 A1 | 7/2004 | Whitacre et al. | |
| 2004/0143470 A1* | 7/2004 | Myrick et al. | 705/7 |
| 2004/0249657 A1* | 12/2004 | Kol | G06Q 10/10 |
| | | | 705/36 R |
| 2006/0235732 A1* | 10/2006 | Miller | G06Q 10/06 |
| | | | 705/7.23 |

OTHER PUBLICATIONS

Verweire, Kurt, Lutgart Van den Berghe. Integrated Performance Management: Adding a New Dimension. Management Decision, 2003; 41, 8: Proquest Central, p. 782. (Year: 2003).*
International Search Report re PCT-GB2004-002627 dated Feb. 28, 2005.

* cited by examiner

Questions

Use the following key to answer the questions:

Choose between;
0 = not at all to 5 = extremely.

| Question | Answer |
|---|---|
| 1. I am concerned about the risks to the survival of the organization | ⊙0 ○1 ○2 ○3 ○4 ○5 |
| 2. Our culture is tuned to managing risks | ⊙0 ○1 ○2 ○3 ○4 ○5 |

Service Improvement Plan

Templates
Improvement Plans — 1403

Back
Home

Create Template

Assess?: Yes

Assessment KPI — 1401

KPI Name:
CSF:
Objective: A sustained focus on what matters
Perspective: Improve speed of SIP implementation
Definition: 1. Strategic Objectiv
Assessment KPI to Im...

Assessment Data Values — 1402

| Step Colour | Step Scorecard Data (*maximum 31 characters only) | Step Description |
|---|---|---|
| 01 | Not Understood | Corporate priorities are not understood. |
| 02 | Understood | Corporate priorities and how they affect the service are clearly understood. |
| 03 | CSF/Priorities linked | Service critical success factors are clearly linked to corporate priorities. |
| 04 | CSF/KPI linked | Service critical success factors are clearly linked to Key Performance Indicators |
| 05 | Actions linked to KPIs | All service delivery actions are clearly linked to Key Performance Indicators |
| 06 | | |

FIGURE 16

1701 SCORECARD of entity
  Outcome Measures  WHAT – using KPIs and KSIs
  Transformation or Maturity Measures  HOW – using KTIs
+ 1702 COACHING of team and/or
  FACILITATION of team meetings
+ 1703 FEEDBACK
  Plan-Do-Check-Act
  Commit-Deliver-Review or
  Plan-Do-Check-Act or
  Plan-Do-Study-Act

= 1704 RESULTS

SYSTEM FOR FACILITATING MANAGEMENT AND ORGANISATIONAL DEVELOPMENT PROCESSES

BACKGROUND OF THE INVENTION

The present invention relates to a system for facilitating management and organisational development for example of the type that supports the processes of expertise capture, management, transformation and/or capacity building, enabling people and organisations to identify potential synergistic relationships and connecting them together in such a way as to support synergetic knowledge sharing, collaboration, action taking, learning.

Significant structural and process change, known as "Transformation", is a pressing requirement for governments (to support Service Delivery) and corporations to support strategic change and good corporate governance.

It is becoming widely accepted that the challenge for CEOs, Executives and Managers in public and private sectors is not so much to create good strategy and policy, but to effectively implement policy and strategy. An individual can manage a project or program with a to-do-list linked to certain project objectives. For an organisation of many people, the complexity of managing objectives and actions limits the ability to maintain effective alignment, coordination and delivery. Potential economies of scale are lost to inefficiencies of inconsistent objectives and uncoordinated actions. Most major corporations and government organisations use indicators. Most use intranet or web search engines and portals.

Even small organisations are often ineffective and inefficient because different people in different parts of the organisation are working in different directions, which at worst cancel each other out or, at best, do not support one another optimally. Furthermore, organisations and networks of organisations often make the same mistakes repeatedly, because they fail to learn from experience. In this respect, a person in a role or function gains important knowledge and experience; when they move on or are replaced, their knowledge goes with them.

Search engines and knowledge discovery tools help users to find information they need from a mass of available information created for many different purposes, both from the Internet and so-called Intra-nets. However, the amount of information that becomes available can become excessive, particularly when there is no effective filing system.

Also, when a process such as a complex change program is being contemplated, it may become clear at the outset that the management capacity available, i.e. the management experience, competence and skills needed, is insufficient. Indeed, lack of management capacity is a major limitation to large change programs, including, for example, the implementation of e-government.

SUMMARY OF THE INVENTION

According to a first aspect of the present invention, there is provided an organizational management system comprising: an input device; a graphical user interface arranged to display, when in use, a scorecard or other representation of information; and a processor coupled to the input device and the graphical user interface; wherein the scorecard includes a representation of a plurality of indicators associated with the entity, the processor being responsive to selection from the plurality of indicators of an indicator using the input device so as to provide access to a plurality of selectable discrete elements that constitute a basis upon which a state of the indicator is determined.

At least one of the selectable discrete elements may be editable.

The basis of determination of the state of the indicator may be a checklist.

The state of the indicator may be colour coded, a colour of the indicator corresponding to the state of the indicator.

Additional information associated with an item of the information associated with the indicator may be accessible in response to a selection of the item of information.

The indicator may be one of a Key Performance Indicator (KPI), a Key Transformation Indicator (KTI), or a Key Survey Indicator (KSI).

The information associated with the indicator and/or the additional information may be a contextual means of access to a source of information.

The indicator and/or a relationship between the indicator and other indicators from the plurality of indicators or information associated with the indicator may constitute meta-data.

A colour of the indicator may constitute the meta-data.

The source of information may be a knowledge base.

At least one of the plurality of indicators may change state in response to at least another one of the plurality of indicators.

According to a second aspect of the present invention, there is provided a content delivery system for delivering content relevant to a profile, the system comprising a server arranged to receive the profile constituting meta-data and parse a plurality of available scorecards in order to identify at least one of the plurality of scorecards having as greater relevance as possible to the profile, a number of the plurality of scorecards having a respective plurality of indicators and content associated therewith; wherein the server is capable of delivering at least part of the content associated with the at least one of the plurality of scorecards to a recipient terminal associated with the profile.

The profile may comprise a first plurality of indicators and the server may be arranged to identify at least one of the plurality of scorecards having as great a relevance as possible to the profile by calculating a characteristic value based upon a number of the first plurality of indicators and a number of respective indicators of the plurality of scorecards.

The server may calculate the at least one of the plurality of scorecards having as greater relevance as possible to the profile by calculating for each of the number of the plurality of scorecards a sum of squares of differences of at least one indicator of the profile.

The first and second characteristic values may be normalised.

According to a third aspect of the present invention, there is provided a method of determining most relevant available content, the method comprising the steps of: receiving a profile constituting meta-data; parsing a plurality of available scorecards in order to identify at least one of the plurality of scorecards having as greater relevance as possible to the profile, a number of the plurality of scorecards having a respective plurality of indicators and content associated therewith; and delivering at least part of the content associated with the at least one of the plurality of scorecards to a recipient terminal associated with the profile.

According to a fourth aspect of the present invention, there is provided a computer program element comprising computer program code means to make a computer execute the method as set forth above in relation to the third aspect of the present invention.

The computer program element may be embodied on a computer readable medium.

According to a fifth aspect of the present invention, there is provided a data fragment comprising data corresponding to at least part of a hierarchy of data, the data being combinable, when in use, with other data corresponding to at least part of the hierarchy of data or another hierarchy of data so as to form at least part of a new hierarchy of data.

The hierarchy of data may correspond to a hierarchy of intent.

The data corresponding to the at least part of the hierarchy of data may comprise at least one indicator and information associated therewith.

According to a sixth aspect of the present invention, there is provided a hierarchy of data comprising a plurality of data fragments, wherein at least one of the plurality of data fragments is selectable for inclusion or exclusion for processing when the plurality of data fragments are processed by a predetermined process.

The at least one of the plurality of data fragments may the data fragment as set forth above in relation to the fifth aspect of the present invention.

According to a seventh aspect of the present invention, there is provided a database of information comprising a plurality of data fragments as set forth above in relation to the fifth aspect of the present invention.

According to an eighth aspect of the present invention, there is provided a use of a data fragment comprising an indicator and information associated therewith to provide or serve as a basis for determining meta-data for performing at least one of: a statistical operation, a search, clustering, comparison, or selection of entities and or information.

Throughout this specification, the words "comprise", "comprises" and "comprising" means "include", "includes and "including" as the case may be, and also "consist of" consists of" and "consisting of" as appropriate.

The following terms and abbreviations are used herein:
An "objective" is a High Level Goal, for example a qualitative goal, such as "Improve Financial Results".
A "Critical Success Factor" (CSF), sometimes known as a "Key Result Area", or a "Key Performance Area", is a Medium Level Goal, for example a qualitative goal, such as "Improve Margins".
A "Key Performance Indicator" (KPI) is a quantitative measure, such as: % Margin=$Sales−($Cost of Sales/$ Sales).
Key Transformation Indicator (KTI)—measures status in a process or transformation.
Key Survey Indicator (KSI)—measures the results of a survey or questionnaire The generic term used for KPI/KSI/KTI is Measure.
A "Perspective" is a high level area or categorisation of measurement, for example Financial or Customer, Critical.
A Known hierarchy of objectives culminating in indicators is referred to as a "Hierarchy of Intent". A scorecard is an example of a collection of current indicators relating to a policy, program, project or strategy that has been expressed as a Hierarchy of Intent. Multiple scorecards can be used to represent the implementation of the same Hierarchy of Intent in multiple organisations. The hierarchy of Perspective/CSF/KPI is an example of a Hierarchy of Intent Objective/CSF/KPI is another example of a Hierarchy of Intent Throughout this specification, the idea of "Hierarchy of Intent" is used. Typically, the examples of Perspective/Critical Success Factor/Key Performance Indicator are used. The Hierarchy of Intent could equally be High Level Goal/Medium Level Goal/Low Level Goal. The examples used should be understood to be interchangeable with any Hierarchy of Intent.

A particular Objective or CSF, or KTI, for example, defines a Current Context within a Hierarchy of Intent.

Herein, where we associate knowledge, security or other attributes to a KPI, KSI or KTI, we assume it can also be associated with an Objective, Perspective, CSF.

In the invention, an important feature is the handling and on-screen presentation of certain Key Performance Indicators (KPIs) and Key Transformation Indicators (KTIs).

KPIs may be entered manually or automatically computed from a computer system or sensors. The combination of KPIs may be derived from a workflow system with the performance management and knowledge management features below.

KPIs may be automatically computed from a workflow system, which itself routes and manages documents, each of which represents, for example, an insurance claim, or complaint. A combination of KPIs derived from a workflow system with the performance management and knowledge management features may be provided.

In order to provide an indication of change so-called Key Transformation Indicators (KTIs) may represent certain aspects of an entity, for example levels of maturity, with colour, pattern, visual, auditory or other sensory codes associated with each level. In the case of colour coding, these are commonly known as traffic-lights; examples of colour coding include rating of level, such as: RED=Low, YELLOW=Medium, GREEN=High, BLUE=Very High; or ratings of projects, change, or achievement, for example: RED=No Plan, ORANGE=Plan, YELLOW=Plan Not On Track, GREEN=Plan On Track, Blue=Plan Done.

In a further enhancement of this approach of colour coding, the level of a KTI in a linear or one (or 2- or n-) dimensional sequence/array of data values may be stored in a database, spreadsheet or multidimensional database and may be colour coded based on a current state of each KTI.

States of such KTIs may be combined with other performance measures, for example sales values, and may be presented in a 2-dimensional array or scorecard to show, for example, progress over time, where, for example, the rows of the array relate to different KTIs and the columns of the array relate to different time periods or to allow comparison, where the columns might, for example, refer to different organisations, locations, budget vs. actual.

When displayed, a given value of the KTI may be expressed as a word, number, or symbol.

A word and checklist may be associated with each level for a defined KTI. The resulting colour coding and word may be automatically displayed in the scorecard.

KTIs may be expressed as traffic lights based on absolute value, a difference between a target or forecast and actual value.

The input device, for example a mouse or keyboard, or programmatic calculation, may be used to set the colour level of a KPI and record the resulting colour coding together with an indication of the level or value of the KTI.

The colour level of the KPI may be set by manual means. The manual means of setting the KPI may be selection from a set of options or a picklist of possible values, each of which is associated with a KTI value. The manual means of setting the KTI may be an input by a user to provide ratings against a checklist and computing by the system of the KTI traffic-light, based on the resulting ratings.

The colour level of the KPI may be set by programmatic means. The programmatic means of setting the KPI may be by computing the value for a KTI, based on computer data or input, for example, from the status of a customer account approval process in a financial accounting system or a project management system.

The current invention provides a means for capturing a project plan or strategy in an electronic form, including definition and rating of progress against KTIs and KPIs. Using KTIs the degree of completion of tasks or activities may be rated by selecting the appropriate level or degree of completion of a task, for example: Red=Not Started, Orange=Planned, Yellow=Started and Off Track, Green=Started and On Track, and Blue=Done.

Progress of captured project plans may be assessed manually or programmatically to generate a scorecard showing status of a project. Repeated assessment may automatically generate a scorecard showing trends in progress over time.

A user with a predetermined level of administrative privileges, for example a so-called "super-user", or a computer program may define one or more templates that may be used to capture plans in a standardised format, thereby capturing expertise in roadmaps for transformation, policy implementation, or strategy execution.

The one or more template may allow combinations of textual descriptions, questions and text capture fields with pre-defined sequences of KPIs, KSIs, KTIs, Objectives, CSFs, or Perspectives. The one or more templates may provide a means for capturing expertise and making it available for use by others. The KTIs may be used once, for example to assess overall project progress, or repeatedly, for example to assess the maturity of a number of processes or client relationships.

At least one template may be a plan template. The plan template may include a survey definition. Surveys may therefore be generated from plan templates. The effective use of plan templates may therefore be further improved by associating analysis, actions and learnings with KSIs (survey results) and other indicators in a scorecard.

Templates may include defined surveys to be used by all plans derived using a given template. Plans may define surveys to be performed repeatedly. The surveys may consist of a number of questions. Results of surveys may be aggregated after each survey is taken and/or may be expressed as traffic lights into survey-derived KPIs, denoted KSIs (Key Survey Indicators) herein. KSIs may be displayed in a scorecard with KPIs and KTIs. Results of the surveys may be compared across respondents, organisations, groups, or people, for example by viewing through scorecards.

Analysis, actions and learnings may be associated with KSIs Learnings, and analyses and/or actions may be compared across entities.

Users may see a personal to-do-list consisting of their currently incomplete actions.

Users may access all actions for all users categorised by Hierarchy of Intent, for example Objective/CSF/KPI. Access to all actions for all users may be subject to security.

An Analysis, may be user input or program generated text, documents, presentations, spreadsheets, which may describe root causes, trends and observations, stories, experiences.

An Action may be a definition of an action program, project, to-do-list, task, action or milestone which may have, associated with it one or more sub-tasks each of which may have a named person responsible and/or a workflow status to indicate its degree of completion and/or costs and/or expected benefits. An Action may include any of the information defined for an Analysis above.

A Learning may be an Action or Analysis referencing specific lessons learned or experiences gained.

An Analysis may be associated with a KTI, KSI or KPI or any part of the hierarchy of intent for an entity in respect of a period.

The current invention provides means for associating Action Plans, milestones and/or associated workflow, for example steps towards completion of actions, with a KTI, KSI or KPI or any part of the hierarchy of intent for an entity in respect of a period.

Lessons Learned may be recorded with Action Plans, milestones and/or associated with a KTI, KSI or KPI or any part of the hierarchy of intent for an entity in respect of a period.

Analysis, Actions, and Learnings may be associated with an entity and/or mode, for example budget vs. actual.

Analysis, Actions and Learnings may be linked together, for example an Analysis may have associated Actions and/or Learnings or an Action may have associated Analysis and/or Learnings.

Each Analysis, Action, and/or Learning may have a named owner.

Sub-tasks of actions or milestones may also have named owners.

Analysis, Actions and Learnings may be associated with an individual KTI or KPI, or with a scorecard reflecting a collection of KTIs, KSIs and/or KPIs or with any part of a hierarchy of intent or entity Discussions that are associated documents reflecting the thread of an on-line conversation, commonly used in Internet news groups and corporate intra-nets may be associated with particular KPIs, KSIs, KTIs, organisations or with an Analysis, Action or Learning.

Reports may be generated to include KPIs that may be in the form of numeric values, KTIs that may include textual rating values, KSIs or Survey results, Traffic Lights, Analysis, or Actions. An Executive Summary Report may be generated automatically to summarise an entire scorecard and associated knowledge.

Each Scorecard and KPI, KSI or KTI may have an owner. Users or groups of users may be defined by the scorecard owner as readers and authors for KPI, KSI or KTI data and/or for Analysis, Actions and Learnings.

By default, all Scorecards, KPIs, KSIs, KTIs, Analysis, Actions, and Learnings may be made available to all users or to no users. Scorecard owners may permit the groups of users associated with other scorecards to view their scorecards. This facility may be implemented for Peer-to-Peer usage.

Scorecard templates may be defined by a named group of users. Scorecard templates may be used to complete plans by a further named group of users.

Parts of a scorecard template may only be accessible to designated users.

It should be appreciated that references to "user" or "users" above in relation to security may refer to a person by name or by role or both.

KPIs, KSI and KTIs may be saved in a library for re-use within template definitions and/or plan definitions.

Sequences of KPIs, KSIs, and KTIs may be grouped and saved for re-use, including grouped under an Objective, CSF or Perspective. Properties of one template may be inherited for re-use in another template.

A template may be locked in order to use the template repeatedly and consistently without changes. A plan may be locked in order that the plan cannot be changed after approval but can only be rated, for example for the purpose of updating a scorecard.

KPIs, KSIs, KTIs, Objectives, Perspectives, and/or CSFs or scorecard elements and associated knowledge in respect of any part of a hierarchy of intent from two or more scorecards may be combined to create a hybrid scorecard.

Scorecards may be browsed, or a search made for the Scorecard or templates or scorecards that are defined to fulfill a particular purpose or intent. Such searches may be made based on the profile or metadata defined by the hierarchy of intent.

A profile is defined as a set or ordered list or other collection of data which may include tags which may be indicator or entity name or names of any part of a hierarchy of intent and values which values may consist of a single number or data item or a plurality of numbers or data items which may in turn be ordered or not ordered.

The profile may also be translated into any other format for expression of metadata for use of search engines and query tools.

However the knowledge may be accessible subject to security rights of the user.

Knowledge relating to one or many organisations may be accessed via a list of documents in a portal with content ordered by one or more of:
  i) User identification, for example a name or a role.
  ii) Personal content generated by the user for the user, for example all actions and/or learnings of the user.
  iii) Organisation
  iv) KPI, KSI or KTI or any part of a hierarchy of intent or entity.
  v) Other defined attributes or categorisations associated with person, organisation, KPI, KSI/KTI or any part of a hierarchy of intent or entity which may be defined by a user of the system and/or a program
  vi) A personal profile of the user which may include any, some or all of their learning style, psychological profile, preferred language, values, opinions, their level of education, metadata for their personal scorecard, personal purpose or mission, vision, history of use of the system and other systems. This profile may be partially or wholly generated automatically by the system and or by user input.

It should be appreciated that the system may use inherent metadata or metatags of the template, plan, scorecard, or indicator to identify and link knowledge to a purpose or intent of the knowledge, for example within a Hierarchy of Intent. The purpose of a user may be defined by one or more KPI, KSI, or KTI, or any part of a Hierarchy of Intent. The user may review the knowledge related to a specific intent.

It should also be appreciated that references above to "knowledge" include references to Analysis, Actions, and/or Learnings.

People may be categorised or hierarchically sorted by Objective/CSF/Measure, Perspective/CSF/Measure or other Hierarchy of Intent, so that the system may allow users to locate people with interests, expertise or knowledge in a particular area.

A user may select, for example, using the input device, a name of an owner, for example of a Template, Plan, Scorecard, CSF, or KPI/KSI/KTI or any part of a hierarchy of intent, in order to achieve one or more of the following:

a) Instant Message the owner.
  b) Email the owner.
  c) Start a discussion thread with the owner.
  d) Be put in telephone or voice contact with the owner.
  e) Find information about the owner.
  f) View a contact network, communities and/or groups to which the owner belongs.

The users may swap between user interface languages while maintaining the same visual display of, for example, a scorecard. An automatically translated version of system content in a chosen language may be selected for display.

Entities may be selected for benchmarking, comparison and knowledge sharing according to the degree of match that they have with the scorecard of the entity or organisation selected.

The Match (M) or similarity of organisation b in respect of organisation a may be computed using any statistical relationship.

The statistical relationship used may be a least squares of differences, using the formula:

$$M = \sqrt{\Sigma i (v_{ai} - v_{ai})^2}$$

Where $v_{ai}$ is the value of component i of the vector V of organisation a.

V is the vector representing the profile of an organisation, which may include any of the indicators, targets, associated knowledge, hierarchy of intent, and functions used to enable and disable indicators (referred to elsewhere as the function η).

For consistency of results, Value Fields and Weighting fields may be weighted so that each field has a fixed maximum and minimum value. A simple means of normalising value fields may be used as follows, based on traffic-light or threshold values, for example:
  Red=0.2
  Orange=0.4
  Yellow=0.6
  Green=0.8
  Blue=1

Or this normalisation may be based on another formula that results in a maximum and minimum value that is comparable across KPIs, KTIs and KSIs.

Further, a weighted Match may be computed by weighting each value $v_{ai}$ according to, a further criterion which may be its priority or urgency. Weighting field values may be normalised to between 0 and 1.

Where the desired weighting is based on priority of the indicator to the two organisations, the weighted Match based on priority, $M_p$, for organisation b in respect of organisation a may be computed as follows:

$$M_p = \sqrt{\Sigma i (p_{ai} v_{ai} - p_{bi} v_{bi})^2}$$

Where $p_{ai}$ and $v_{ai}$ are the priority and value respectively of component i of the vector V of organisation a.

Similarly the weighted Match based on urgency u is computed $M_u$ $$M_u = \sqrt{\Sigma i (u_{ai} v_{ai} - u_{bi} v_{bi})^2}$$

The results of such a weighted match may be ordered in a list sorted by Mu or Mp showing the most similar organisations to organisation a as closest to a in the list. Alternately, they may be displayed on a linear scale, where the distance between points representing organisations a and b represents the degree of match between these organisation. The scale may be adjusted (for example to show logarithmic values) in order to improve the ease of comparison and understanding.

A multi-dimensional comparison may be made by comparing the Match in respect of multiple value fields. The results can then be displayed on a 2-dimensional plot or other visual display.

Priority may be displayed on the Y-axis and Urgency may be displayed on the X-axis. The resulting 2 dimensional plot may be used to visually identify similar organisations.

This allows an organisation to identify strategic benchmark organisations, based on Priority and tactical benchmark organisations, based on Urgency.

The plots described above may be further enhanced by showing a third dimension as the size of the plot point, where the radius or area of the plot point represents the overall value Match M or the value of some other variable.

The system may provide an automated software feedback mechanism to ensure that the indicators used in the scorecard for an entity may change based on the current values of the metadata for the scorecard.

Indicators in the scorecard for an entity may be enabled dependent on the current metadata of the entity or disabled dependent on the current metadata for the entity.

One example of such a feedback mechanism can be represented as a function f operating on the scorecard metadata. The scorecard metadata may be represented as a vector $V_{(t)}$ which may include the values of the KTIs, KSIs and KPIs that are in use in the scorecard. These are a subset of a larger set of indicators V. Indicators (and hence related knowledge) may be disabled or enabled dependent on the current value of V.

$$V_{(t)} = f(V_{(t-1)}).$$

f may be a matrix of conditions of type:
  IF Condition THEN Enable/Disable vj
For example:
  IF $v_i > 6$ THEN Enable $v_j$ The inventions and systems described herein combine the feedback and improvement approach of quality management described in such approaches as Plan-Do-Check-Act, with the additional step of learning and capturing learned experience in a knowledge management system.

It is thus possible to provide a system aimed at enabling organisations to develop, benchmark and learn more quickly and effectively by accessing information that is directly relevant to their goals and particular situation and to provide a system aimed at the translation of intention into actions for organisations of any scale even spanning boundaries of ownership, management and location. Additionally, the system, when realised as a software program and supported by an appropriate management process, provides a way of defining implement-able strategy and policy, together with an effective implementation strategy and policy, together with an effective implementation and delivery engine for an organisation of any scale. Further, it is possible to assist in aligning actions across an organisation or network of organisations with a consistent set of objectives. Also, the system permits systematic and effective harvesting of learning from experience and makes learning available for re-use by others across an organisation or network of organisations. Systematic capturing of history and experience of personnel is also made possible so that the expertise related to their role or function is available to a future replacement.

Through the use of tools, for example to capture roadmaps, checklists and processes as re-usable scorecards to support on-the-job learning, it is possible to increase or build capacity, especially when lack of management capacity is a problem, by enabling an organisation to re-use its experience, competence and skills.

By capturing knowledge linked to a strategy or objectives of an organisation, it is possible to ensure that knowledge is filtered and meta-tagged and 'filed' against the objective(s) that the knowledge supports as it is created. Consequently, a significant improvement in the overall process of knowledge creation, capture, discovery and re-use is achieved. Further, retrieval can be rapid to support a user in meeting a specific objective.

A further advantage is that an effective way to generate the metadata from an indicator or plurality of indicators to retrieve knowledge for search engines and database queries and thereby to retrieve meaningful and focussed information is provided. In this respect, search criteria are implicit in the state of the system and can be used to reduce the amount of information retrieved, while improving the relevance and quality of the information retrieved, thereby eliminating irrelevant information and focussing on relevant information. Consequently, a reduced need for an intelligent search engine, or that the search engine can be substantially more effective by using appropriately filtered and tagged information related to the organisation's goals (KPIs), process of change (KTIs) and culture, opinions and values (KSIs). Further, use of metadata is an effective basis for choosing organisations to benchmark and compare.

Additionally, investment in developing indicators to reflect the goals of the entity is re-used and leveraged to organise and access knowledge and, in the process, to focus the entity on the goals of the entity. The investment in developing indicators is therefore used to reduce the effort required for search and query and to allow development of more effective business-focussed portals. The link has between collections of indicators used for management and search has not previously been made because quantitative business intelligence (which develops indicators) and qualitative knowledge management (which deals with search) are treated as separate disciplines and use separate software programs.

Also, it is possible to allow progress of change and transformation to be measured and, as a result, allow the process of transformation to be managed. It is also possible for expertise in change: blueprints, roadmaps and steps for transformation to be codified, continuously improved, shared and re-used by a small or large community within an organisation or between organisations.

Even though the process of transformation and change is necessarily dynamic, it is nevertheless possible to provide a way for the focus of a management system to evolve in response to the evolution of the system that it is measuring.

In relation to contextual knowledge retrieval and expertise on demand, when organisations or people have similarity of situation, makeup or intentions, there is potential synergy. Since the same indicator may be used repeatedly in a plurality of entities, knowledge created by users of the indicator in the context of one entity and stored in a knowledge base is accessible by users of the same indicator in the context of another entity. This knowledge can be accessed according to the means of automatically established Links.

Lastly, the use of transformation indicators makes it easier and hence achievable to embed checklists containing knowledge into a scorecarding system; they are a richer store of information.

BRIEF DESCRIPTION OF SEVERAL VIEWS OF THE DRAWINGS

At least one embodiment of the invention will now be described, by way of example only, with reference to the accompanying drawings, in which:

FIG. 10 a screenshot of an on-line survey used to determine a KSI;

FIG. 12 is a screenshot of an alternative KTI data entry form;

FIG. 14 is a screenshot of the template creation screen of FIG. 13 for creating a KTI a template;

FIG. 16 is a screenshot of a scorecard portal generated from an Improvement Plan or template of FIG. 15;

DETAILED DESCRIPTION OF THE PREFERRED EMBODIMENTS

Figure 1A:
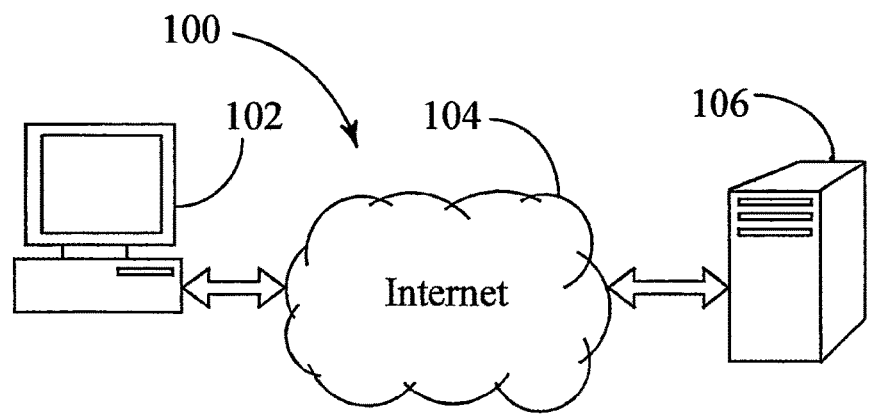
FIGS. 1(a) and (b) are schematic diagrams of apparatus to support an embodiment of the invention.

Throughout the following description identical reference numerals will be used to identify like parts.

Referring to FIG. 1(a)), a hardware configuration 100 comprises a client terminal 102, for example a computer, such as a Personal Computer (PC). The PC 102 is arranged to support a web browser application, for example the INTERNET EXPLORER application available from Microsoft Corporation.

The PC 102 is coupled to, for example, a Wide Area Network (WAN), such as the Internet 104. A remote server 106, for example any suitable server capable of storing and operating a local database is also coupled to the Internet 104. The server 106 supports an application that, in this example, uses software portal functions found in WEBSPHERE or DOMINO software available from IBM® together with to serve relevant web pages to the client terminal 102.

Figure 1B:
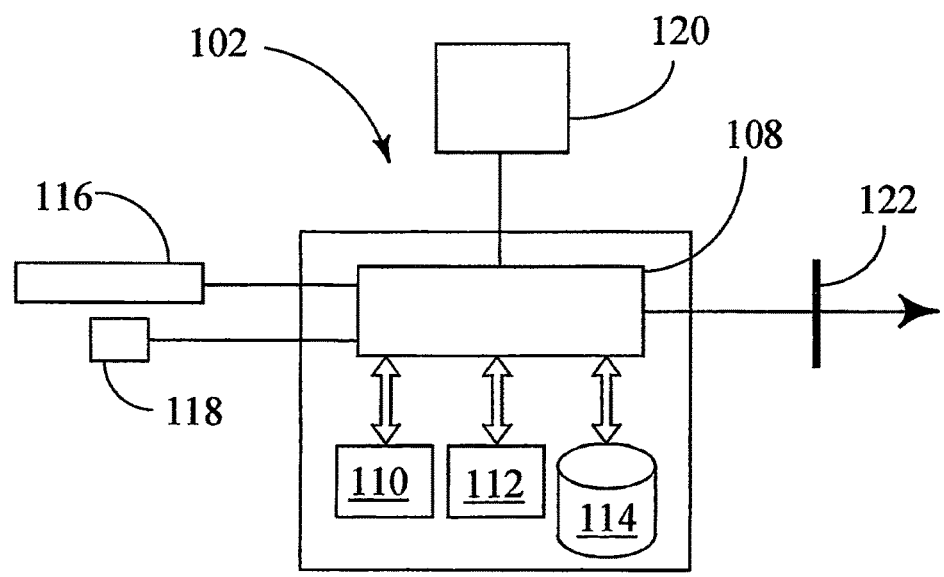

For the purposes of simplicity and clarity of description, a simple structure of the server 106 will now be described briefly (FIG. 1(b)), but the skilled person will appreciate that additional complexity of the server 106 not described herein. However, in relation to the present invention, the additional complexity is not directly relevant to the description of the present invention.

The sever 106 comprises a processing unit 108, for example a microprocessor, coupled to a non-volatile memory 110, for example a Read Only Memory (ROM) and a volatile memory 112, for example a Random Access Memory (RAM). The processing unit 108 is also coupled to a non-volatile storage device, for example a hard disk drive capable of storing a database 114 and associated software, for example the application. The processing unit 108 is also coupled to a first input device, for example a keyboard 116 and a second input device, for example a mouse 118. An output device, for example a Visual Display Unit (VDU) 120 is also coupled to the processing unit 108. A communications interface 122 is also provided and coupled to the processing unit 108 as well to permit the PC 102 to communicate with the server 106 via the Internet 104.

The PC 102 is similarly structured to the serve 106, but the processing power of the sere 106 is greater than that of the PC 102. The PC 102 supports a Graphical User Interface (GUI) capable of displaying a scorecard 210 (FIG. 2) that is a representation of an intention of an entity in a measurable form.

Figure 3:
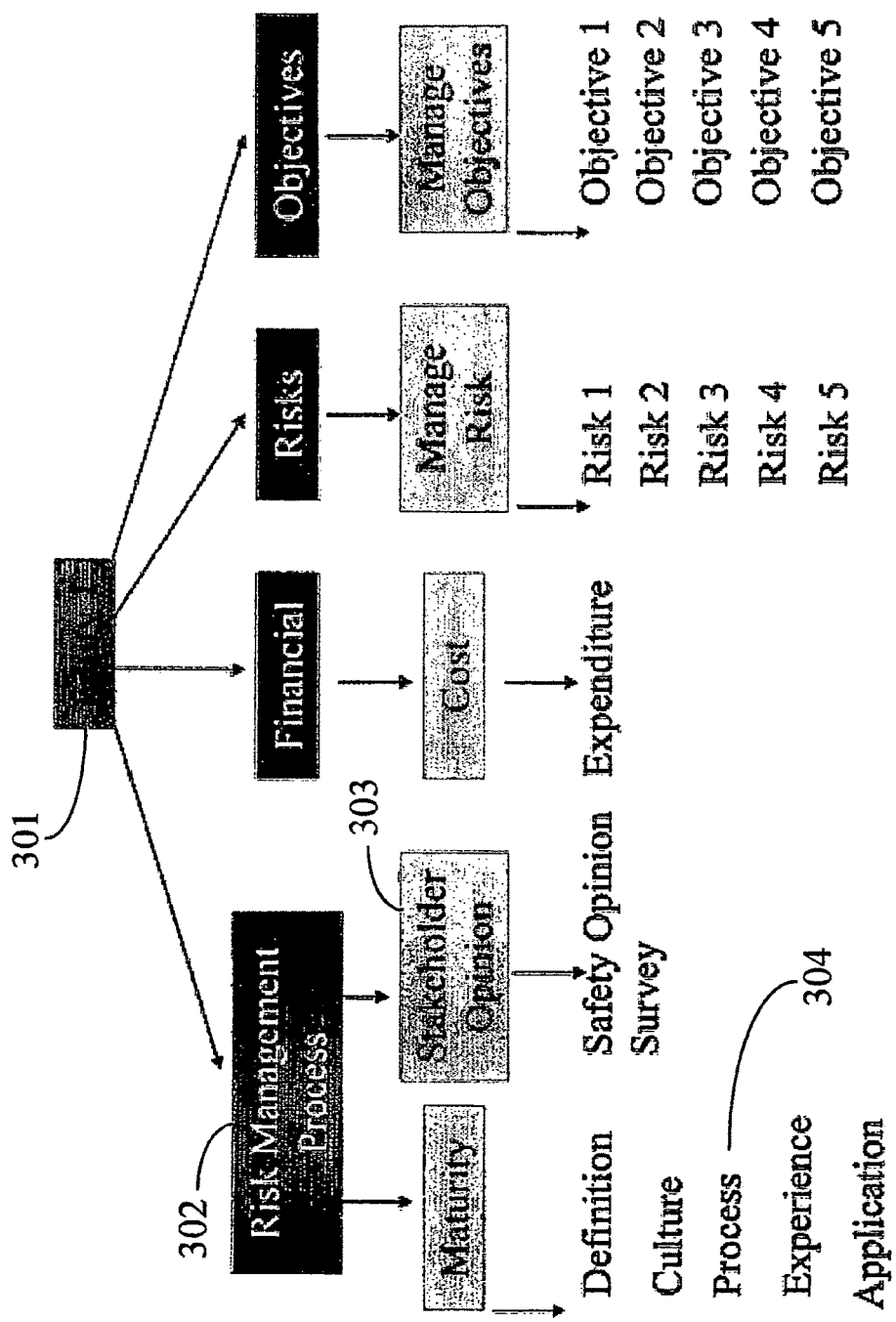
FIG. 3 is a schematic diagram of a hierarchy of intent.

In this respect, expertise embedded in the scorecard is organised into and constitutes a hierarchy of intent (FIG. 3). At the top of FIG. 3 is a box representing the entity named "Entity 1" 301. Below this, are boxes representing the Perspectives which are high level goals 302 and, below this, boxes representing Critical Success Factors which are low level goals 303 and below this are listed the associated indicators 304 for the Maturity Critical Success Factor, namely "Definition", "Culture", "Process", "Experience" and "Application".

Figure 4:
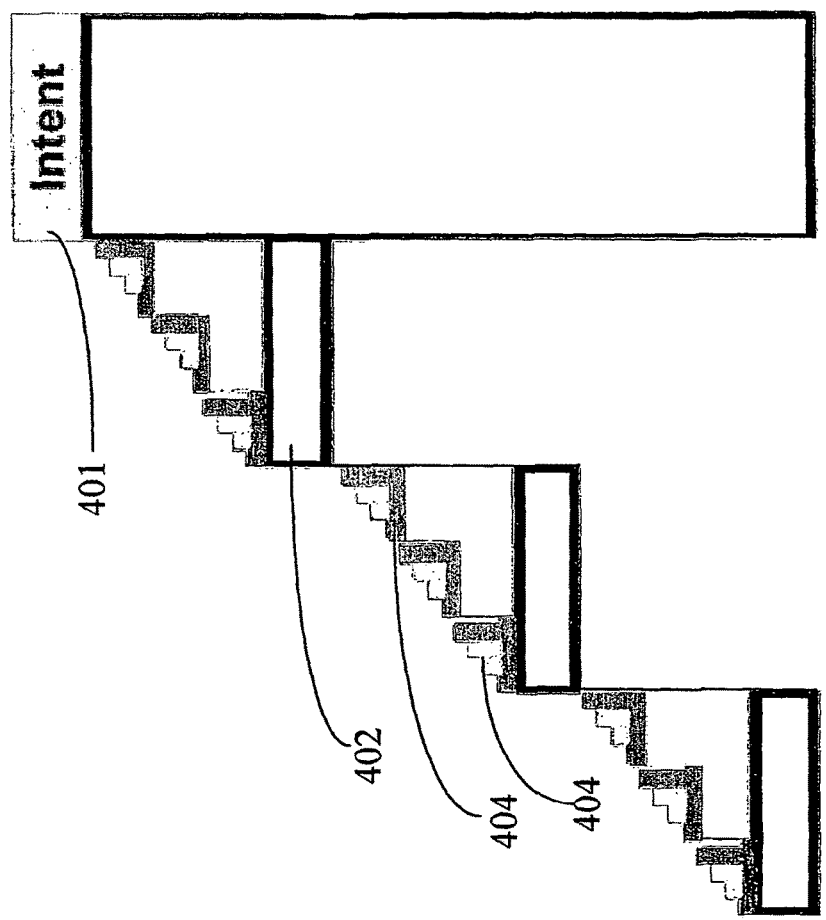
FIG. 4 is a schematic diagram of a breakdown of a transformation into goals.

Turning to FIG. 4, the Hierarchy of Intent for Entity 1 is again represented and the breakdown of the Risk Management Intent of the Entity into High Level Goals 401, Low Level Goals 402 and Indicators 403 is shown. Key Transformation Indicators (KTIs) identified in FIG. 3 for the Low Level Goal or Critical Success Factor "Maturity" measure progress towards the goal of maturity, by breaking down the goal in areas of "Definition", "Culture", "Process", "Experience" and "Application" into small steps that can be measured. This figure indicates that a large intent, transformation or change process can be broken down as a Hierarchy of Intent into smaller achievable steps. The software and apparatus described herein facilitate this breakdown and also the management of the achievement of the change or transformation.

This scorecard represents the Hierarchy of Intent corresponding to the intention of an entity, in this case in respect of Risk Management. Where the Hierarchy of Intent relates to Risk Management, it provides a simple basis (set of metadata) for profiling Entities in respect of Risk Management.

Generally, Hierarchy of Intent provides a basis for clustering similar organisations for the purpose of benchmarking, knowledge sharing and learning. In this case, the Entities listed 204 have been derived based on the metadata of the current user and of Entity 1 as defined by the scorecard and associated knowledge.

The Hierarchy of Intent goes beyond a set of KPIs which is the typical basis for comparing of, say, government departments, to KTIs and KSIs which provide an insight into the processes being implemented and the culture of the organisation implementing them.

The application can be used to identify organisations where there are potential learning or partnering synergies through aligned goals (KPIs), change plans (KTIs), aligned culture (KSIs), etc. This all happens transparently to the user, since the system is able to use the Hierarchy of Intent to decide what the user is likely to want to see.

Clarity and focus of Hierarchy Intent provides a basis for significant improvements in productivity of organisations. Holding an aligned intent or goal, with a shared understanding of how that goal will be achieved and a positive culture of cooperation for achieving the goal provides synergy.

An individual may experience so-called lucky coincidences. Believing oneself to be lucky has been proven to be positively correlated with clarity of goals, positive attitude and being in contact with other people to 'allow luck to happen'. By focussing a team or organisation on common goals (KPIs), change plans (KTIs) and positive culture/attitude (KSIs) and connecting individuals and teams with other individuals and teams with related KPIs, KTIs and KSIs, the system allows a team to attract good luck on an organisational level. This is because the system supports the organisation to focus on clear goals, align on change plans and develop a positive culture.

Referring back to FIG. 2, the scorecard 210 is a tabulated display of data, which includes in this example a traffic-lighting or colour-coding of data according to certain formulae. The scorecard 210 can be accessed by a use of the terminal 102 via a web portal or workplace supported by the serve 106. The user of the terminal 102 types in the URL of, or links to, the web page of the portal, typically after logging in with a password. The link may go directly to this screen, or to a customised main navigator with a graphical menu. The scorecard 210 shows indicators varying over time and consists of indicators comprising KTIs 201, a KSI 202, and a KPI 203.

KTIs 201 are indicators or measures of change supported by related checklists and knowledge, KSIs 202 are measures of opinion generated from a survey and KPIs 203 are the measures commonly known as Key Performance Indicators or KPIs. The example KPI shown here is of Expenditure. In this description, KPIs will always refer to indicators or measures that are not KTIs or KSIs.

In this example, the scorecard 210 corresponds to the first entity, "Entity 1", and is selected by clicking on a link to the first entity, whereupon the scorecard for Entity 1 is displayed. KPIs, KTIs and KSIs are organised according to a Hierarchy of Intent that is in this case Perspective 205, shown in this example (although not visible in colour in the drawings) as a dark blue line across the scorecard, CSF 206, shown as a grey line across the scorecard, and Indicators 207 shown as white and coloured cells within the scorecard. Entities can be selected by clicking in the hierarchy (or list) of Entities 204. Knowledge associated with a selected indicator including the state of the indicator and optionally the colour coding of the indicator determines the links that are accessible in the bottom left hand frame of the portal identified as Analysis/Learning 208 and in the bottom right hand frame of the portal identified as Action/Learning 209. The source of the information retrieved into the frames 208 and 209 may be derived from previous user input, from the input of a master user or from a knowledge base.

While this screenshot shows the use of the software for a Risk Management scorecard, the same software, with a different Hierarchy of Intent, can be used, for example, to support effective management in association with Process Improvement Software.

Figure 2:
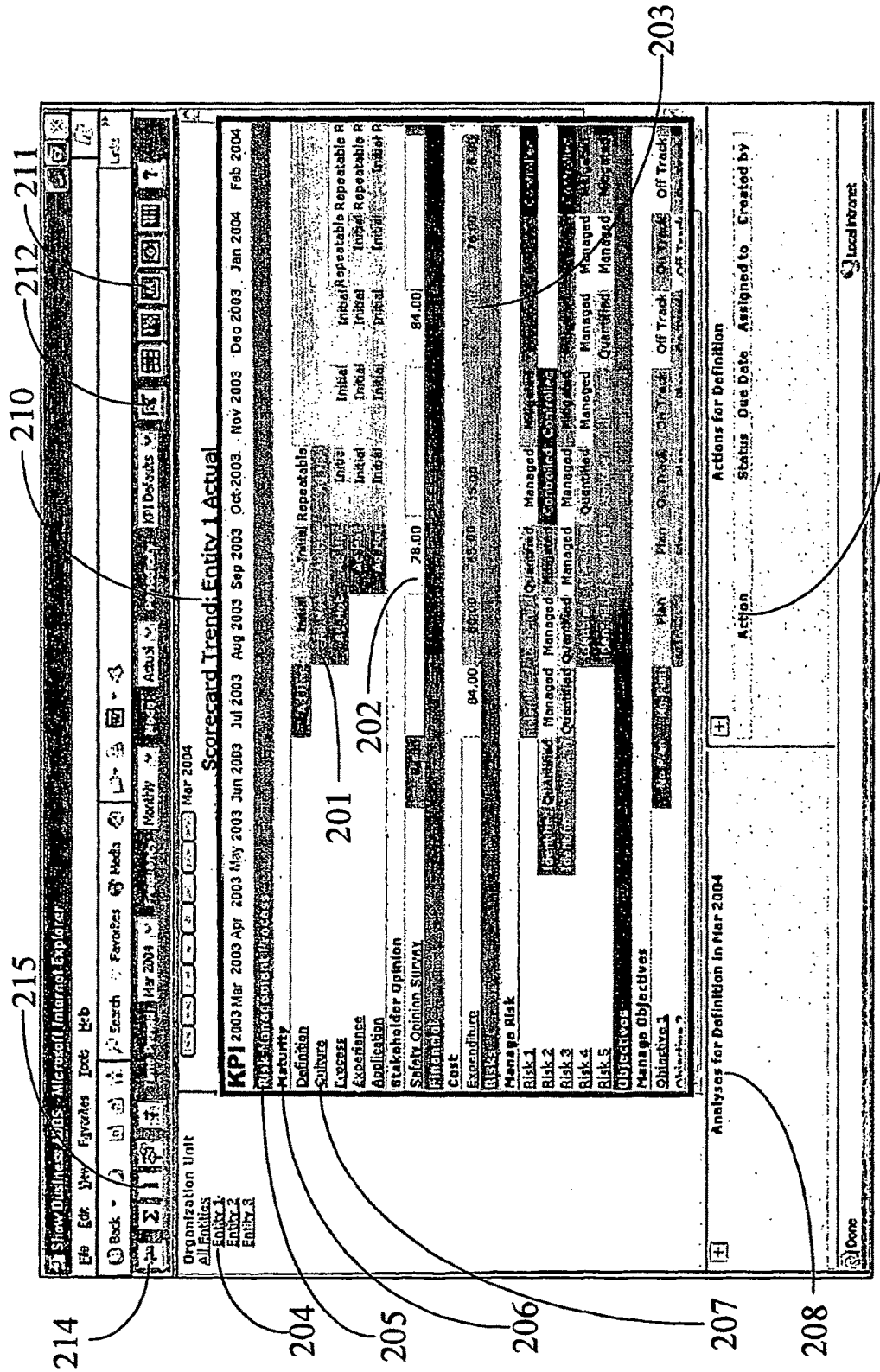
FIG. 2 is a screenshot of a web browser supported by the apparatus of FIG. 1 and displaying a scorecard via a web portal.

From this principle screen, the user can:

Click on one of a number of buttons 211 to select a different scorecard display. The particular case for a scorecard comparing the current Entity with other Entities is shown in FIG. 2.

Click on a link related to the current Entity where applicable KPI, KTI or KSI

Figure 11:
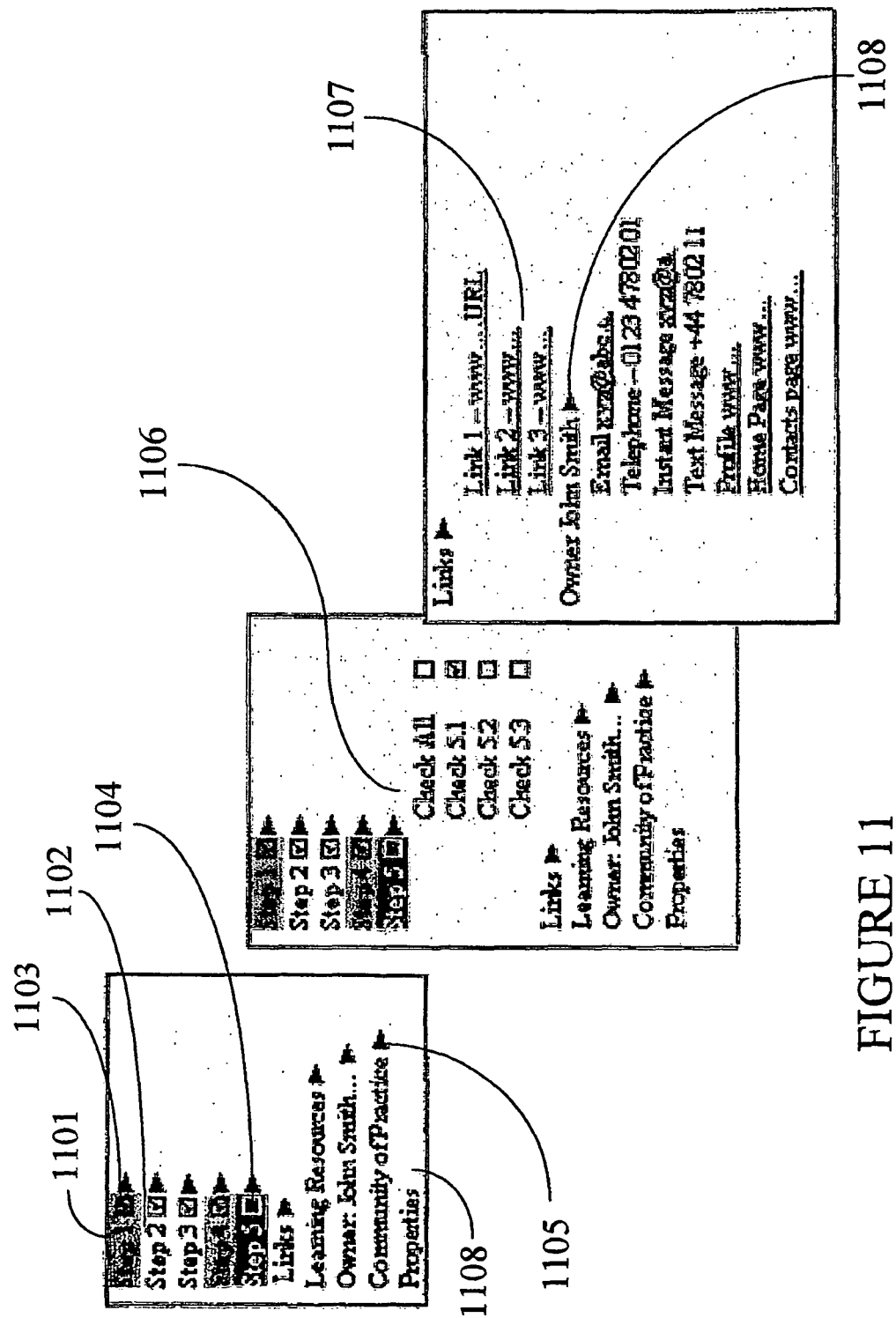
FIG. 11 is a screenshot of a drop-down menu for use with the scorecard of FIG. 2.

Right Click on a KTIs 201, a KSI 202 or a KPI 203 to drill-down to the knowledge associated with the KTI. The resulting cascading menus are shown in FIG. 11.

Figure 6:
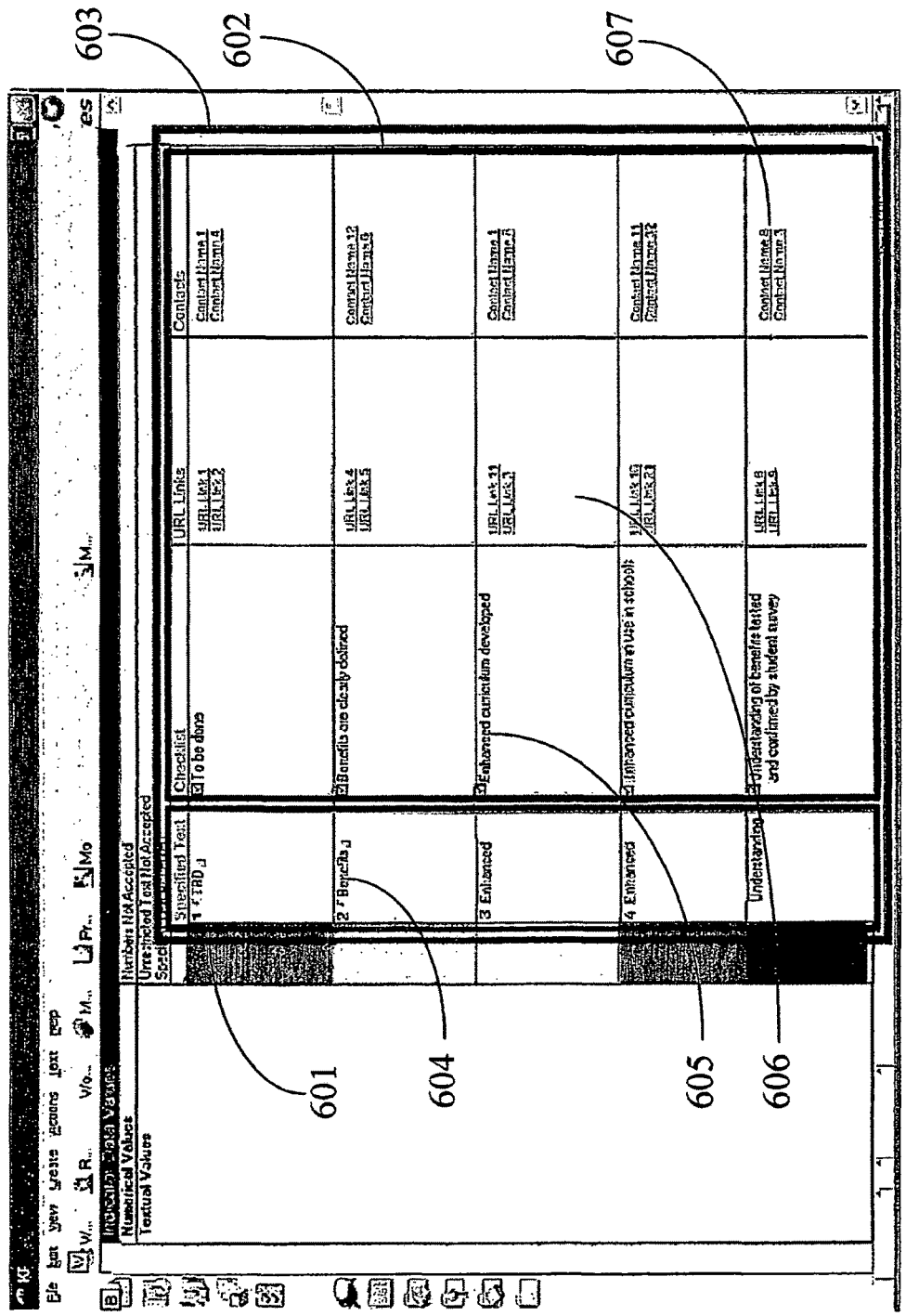
FIG. 6 is a screenshot of a configuration screen for providing knowledge and expertise when defining a KTI.

A master user can view or define the contents of these menus, by choosing the Properties menu 1108. The web screen used to view and edit these properties for a KTI is shown in FIG. 6.

Figure 8:
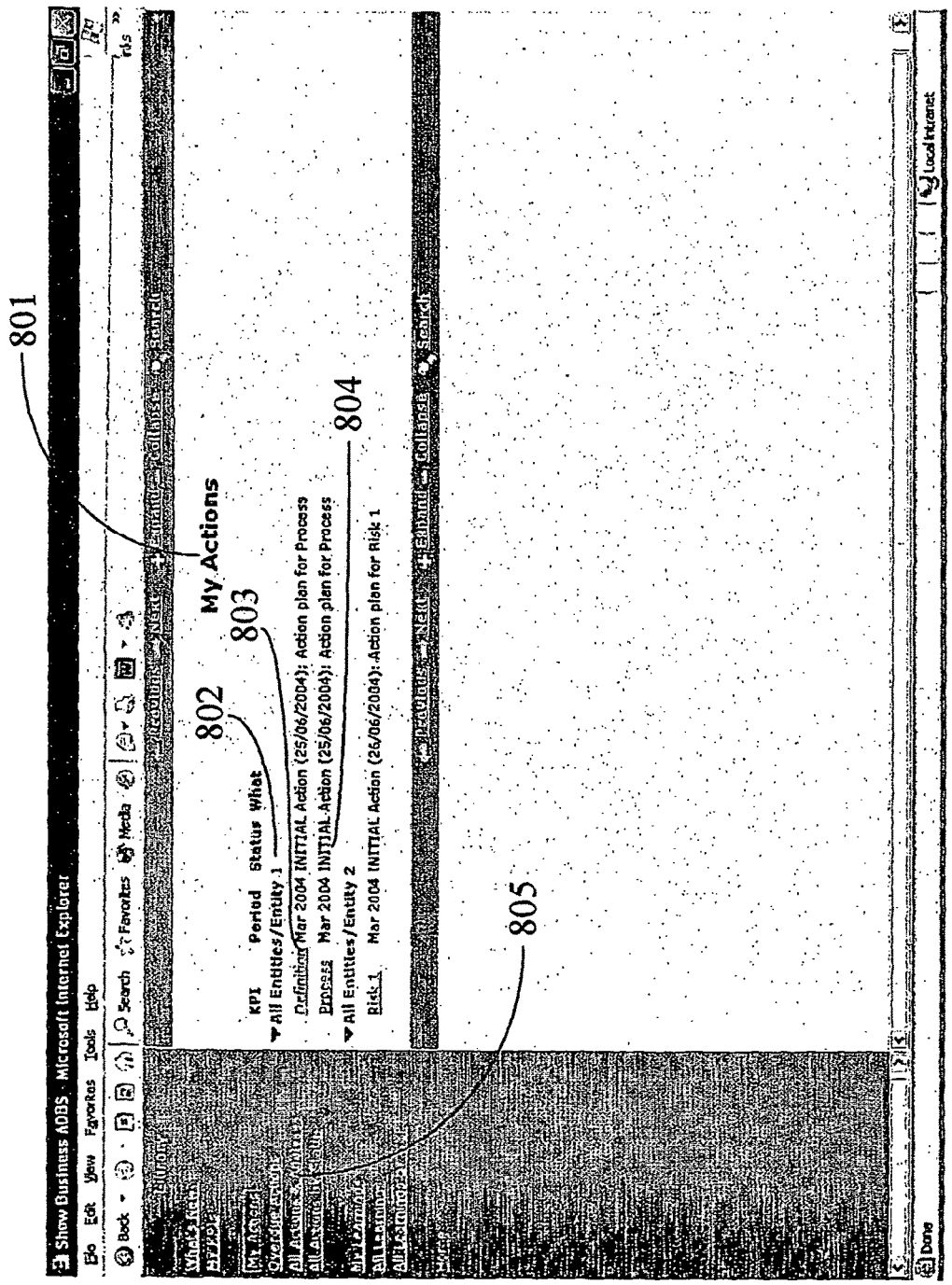
FIG. 8 is a screenshot of a web page that permits a user to review actions to be completed by all users and related analysis or explanation documents as stored by the system against the name of the user.
Figure 9:
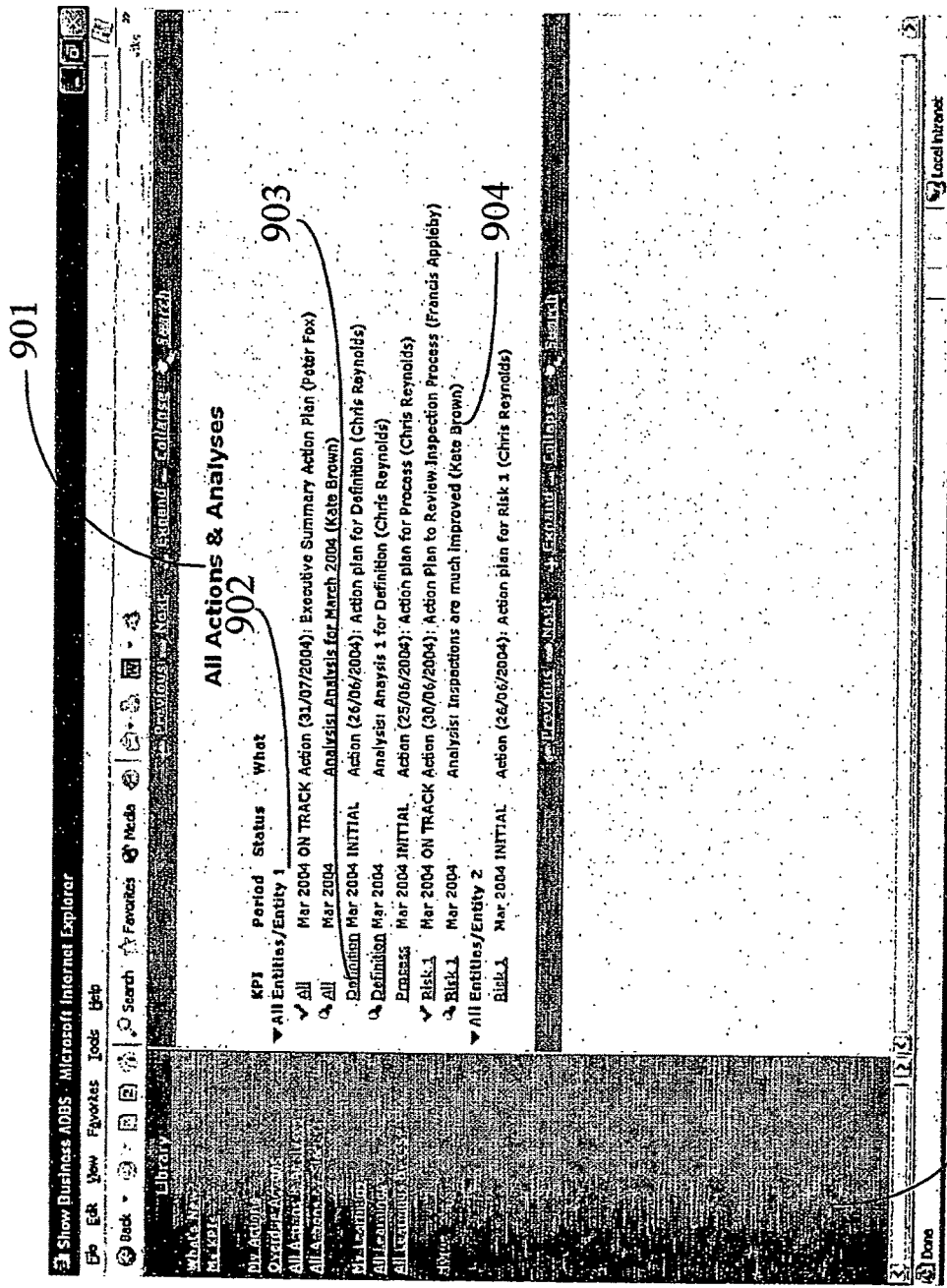
FIG. 9 is a screenshot of a web page that permits a user to review all actions to be completed as stored by the system against the name of the user.

The user may click on a button 211 to return to a main navigator which provides buttons with links to access different views of information, in the knowledge base including a link to show the user different categorised views of the associated knowledge base including an "All My Actions" screen (FIG. 8) and an "All Actions and Analyses" screen (FIG. 9).

---

In relation to KTIs, an exemplary data type structure is:
In the following:
"|" indicates "OR" (labelled as the disjoint Sum)
"+" indicates "AND" (labelled as the Cartesian Product)
"X List" denotes an ordered sequence of elements of type X with 0 or more elements.
A KTI data type is defined as:
KTI = Name + Accountable + Description + Step List + Link List
    {A Name, name of Accountable person, Description and list of steps and URL
    Links related to the KTI}
    Step = Short Name + Colour + Accountable + Description + Check List + Link
    List
        {A short name [typically few enough so that the name can be shown in-
        full in the scorecard cell], Colour, Description, Accountable person and
        Checklist of criteria for that Step, together with a list of URL links related
        to that Step.}
        Check = Condition of Satisfaction + Link List
            {Each Condition of Satisfaction can have its own list of URL
            links}
            Link = Person/contact/user|URL|Knowledge Base|Learning
            Resource|Community of Practice
            {Links can be to people, knowledge generated by the
            system, learning resources, or on-line communities of
            practice}

Figure 12:
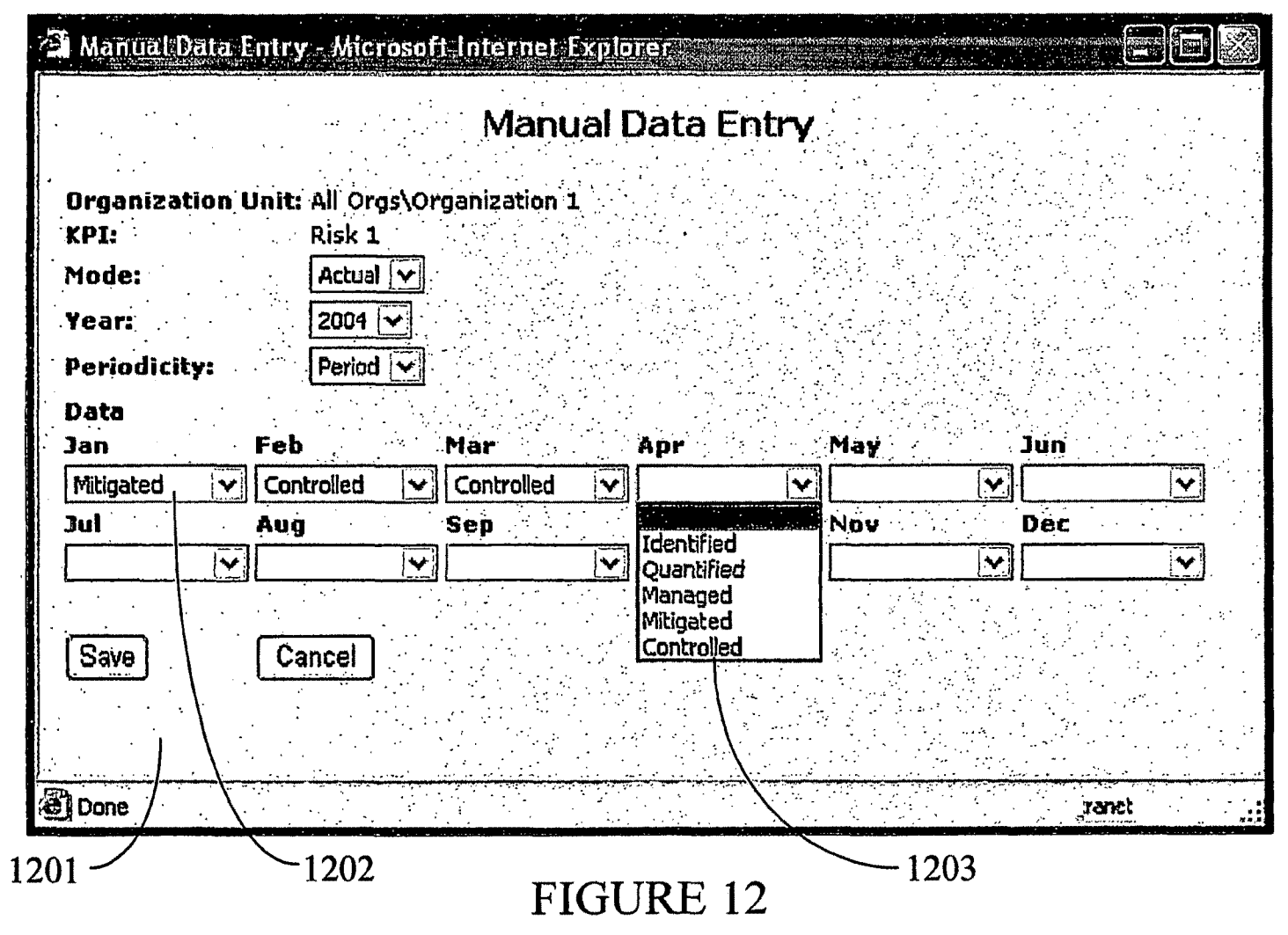

To entering data for an indicator the user may click a button 212 to update the data using a simple data entry form. The form displayed for the KTI Risk 1 is shown in FIG. 12.

Figure 13:
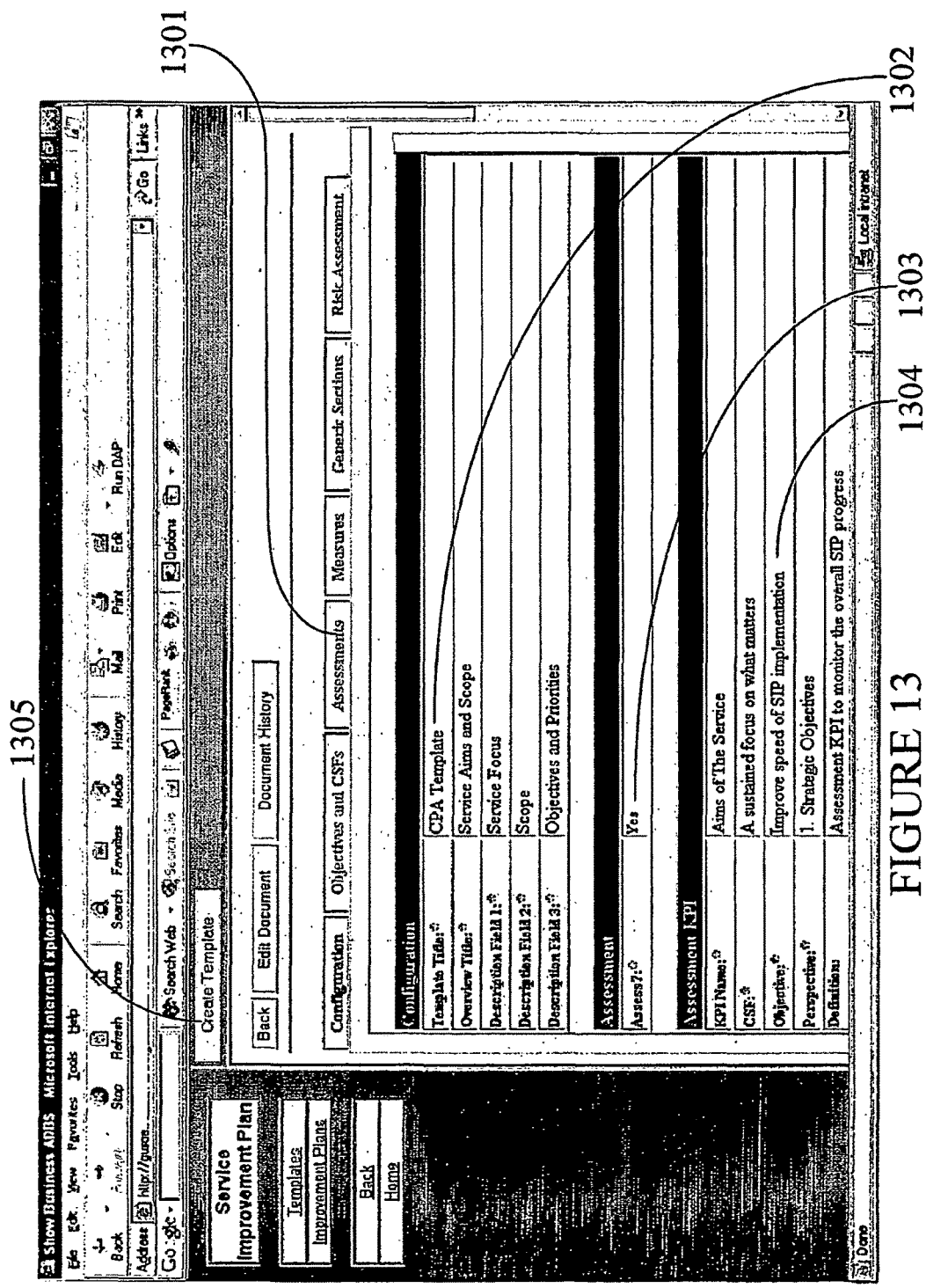
FIG. 13 is a screenshot of template creation screen.
Figure 15:
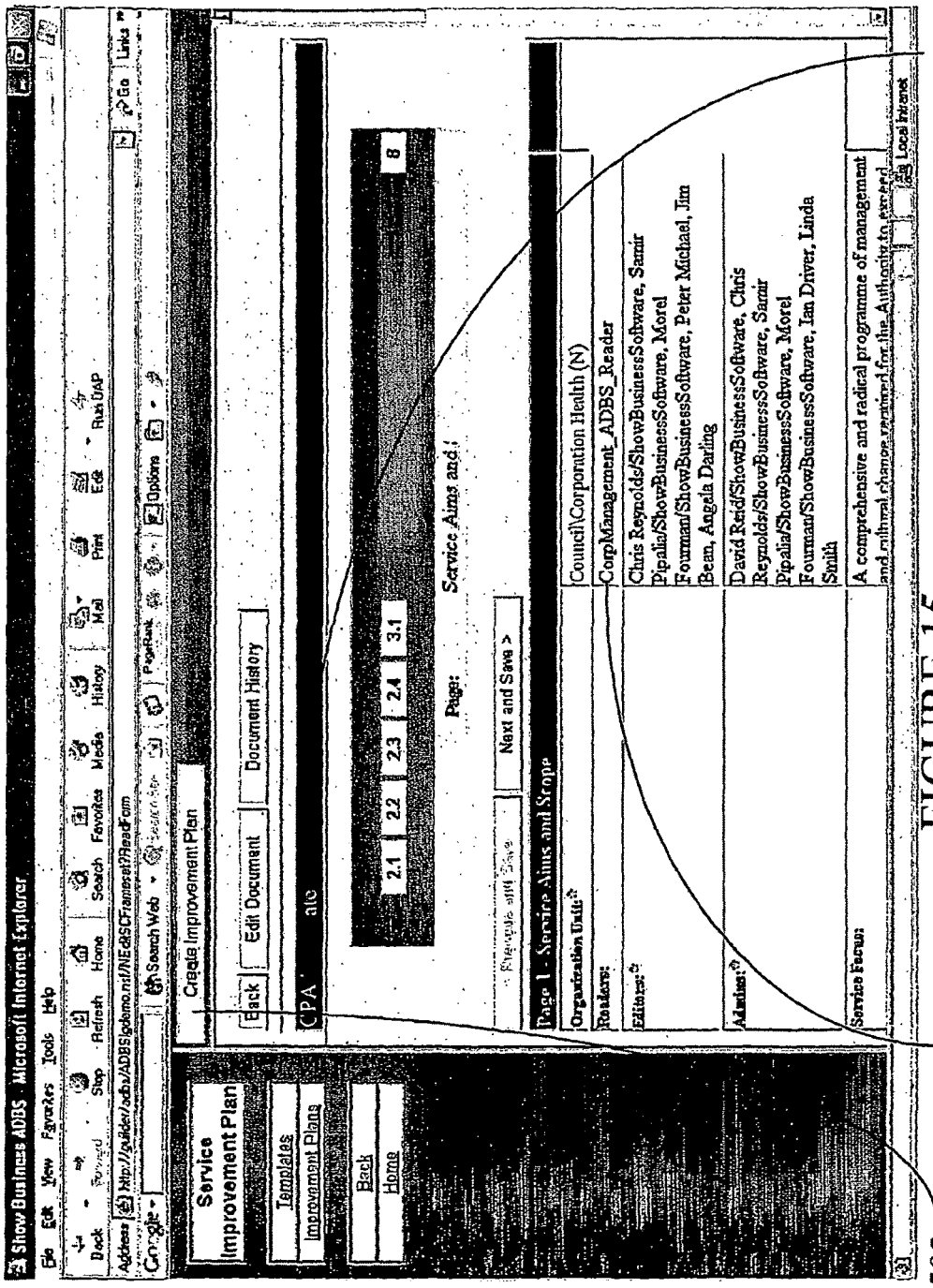
FIG. 15 is a screenshot of is a screenshot of a completed template.
Figure 16:
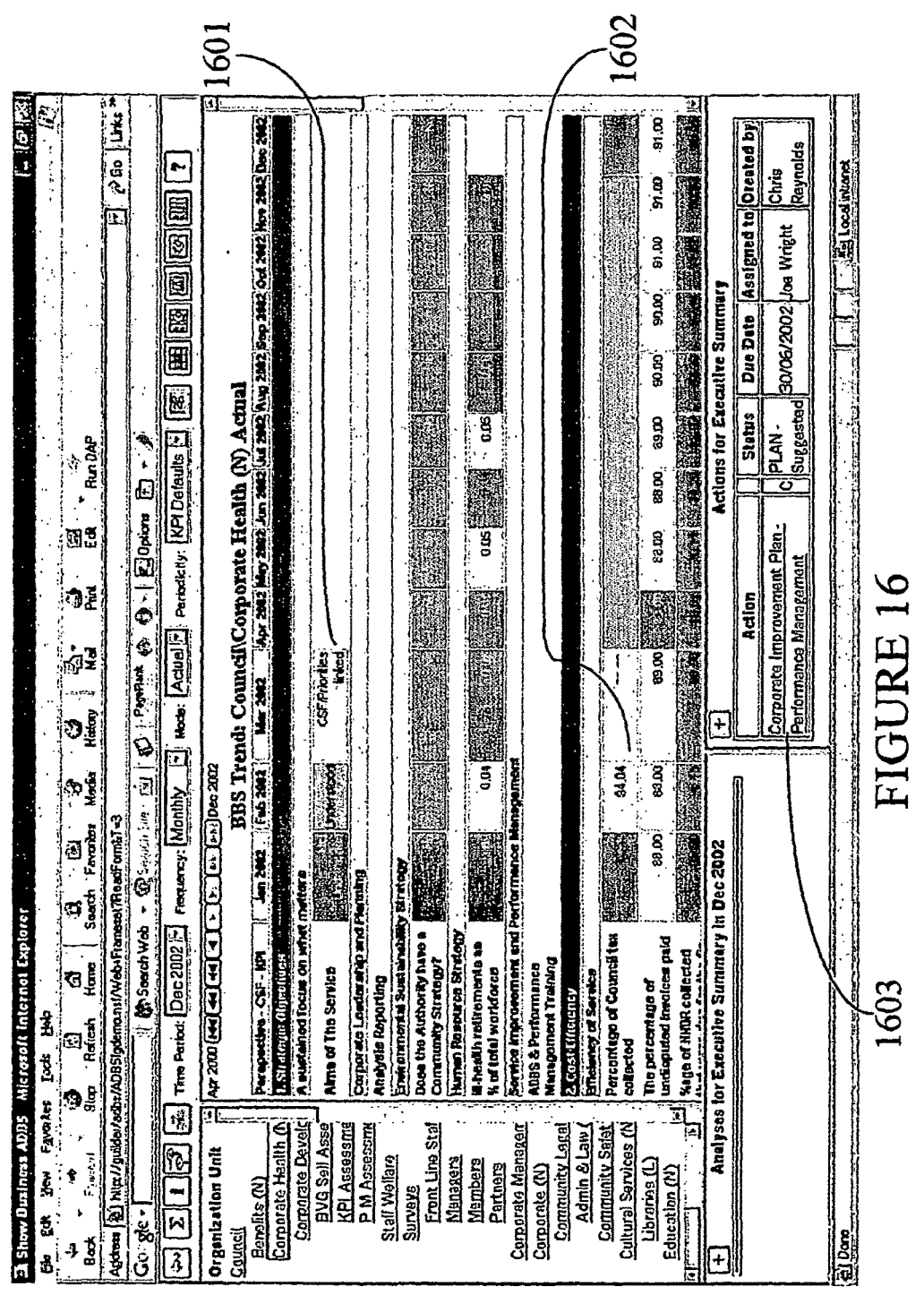

From the main navigator, a master user may also select the Improvement Plan module to develop a scorecard Template as shown in FIG. 13 and FIG. 14 or to fill in an existing template as shown in FIG. 15 and to automatically build a scorecard from the filled-in template FIG. 16.

The list of Entities shown in the selection box 204 is controlled by the security rights of the user of the system. A master user may see more Entities and their scorecards than would be seen by other users depending on their security privileges. Different users may see different Indicators, knowledge and other information.

The web portal or workplace is dynamic in that the definition (parameters) for the frames 208 and 209 can be varied by the user or master user, to allow different knowledge to be displayed in the frames 208 and 209, for example, people, learnings, links, education materials. This is best achieved by use of the software in a general web portal system like IBM Websphere.

The Entities displayed in the Entity selection box 204 can be set to be selected based on the meta-data or indicator data of Entity 1 and/or of the Entity with which the user of the system is associated.

The scorecard shown in FIG. 2 can be used to display the status of a Risk Management process being operated within an ERP system like SAP or a workflow system.

In this case,

KTIs are manually or automatically generated to show the degree of implementation of standard processes (in this case in Risk Management).

KPIs are automatically generated from the ERP or workflow system to show the level of outcomes being produced, for example, average end-to-end speed of delivery, average time in a particular process step, number of items in a particular stage of a workflow or in this case, expenses incurred.

KSIs which are used to measure the opinions of stakeholders in the process can also be recorded.

The scorecard 210 combines KTIs and KPIs and KSIs enabling a manager to rapidly understand the status of the Risk Management process for management purposes. The scorecard and underlying knowledge base embeds management and process expertise that the user accesses by means of the web portal shown in FIG. 2. Different aspects of the Risk Management process are supported by different workflow systems. Individual risks are managed in a separate database system, with summary results only delivered into the system described.

KTIs for Definition, Culture, Process, Experience and/or Application 207 are captured by the system described.

The system shown is used for deployment of a best practice Risk Management Policy, process guidelines and standards defined in KTIs, KPIs, KSIs and related knowledge. The contents of these indicators and knowledge capture the expertise of a global community of expert practitioners. When a user uses the system described, they effectively access and apply the combined knowledge and expertise of the practitioners.

Referring to FIG. 6, to capture Risk Management knowledge and expertise, the master user can select the Properties option in the drop-down menus shown in FIG. 11, or click on the button 214 in FIG. 2 to display the web form 600 FIG. 6 shows the interface whereby a master user can define a KTI and user of the system can access knowledge associated with a KTI. A KTI relates indicator information 601 and knowledge 602 to comprise Process DNA 603, the nature of which will be described later herein. An administrator can define the short text label 604, Checklist 605, URL Links 606 and Contact people 607 associated with each colour-coded step in a KTI. Links 606 can be generated by users of system as they use the system recording Analysis, Actions and Learnings (experience with this step), manually entered by a master user or expert to share their knowledge, or generated by search engine or other programme that has used metadata associated with the indicator to retrieve related knowledge. The simplest example is where the indicator name and hierarchy of intent is used as meta-data for a search engine.

The Web form shown in FIG. 6 has been used to capture a part of a body of Risk Management expertise in a KTI. The Risk Management web portal combines many such pieces of expertise in a structured form to provide a total blueprint.

Using this approach, knowledge, for example, definitions, search engine results, web/Intranet links, on-line training courses, calendar of related events, contact details of related people, is available to users.

These various resources are stored according to the KPI/KTI/KSI to which they relate and are achieved in the context that they are required, either using the menus shown in FIG. 11 or the frames 208 and 209 shown in FIG. 2.

When the master user or users have completed this and other similar forms defining KTIs, KPIs, KSIs and related knowledge, users have easy access via the scorecard 210 in FIG. 2 to the information they need to progress their Risk Management available on-demand so they learn 'just in time' by using the system.

Turning to FIG. 11, the drop-down menu 1101 can be activated by right clicking with the mouse on a KTI in the Risk Management Scorecard. The drop-down menu shows colour-coded steps in appropriate colours 1102. Checked or completed items are denoted by a ticked checkbox 1103. A checklist item can be marked as completed by selecting an unchecked checkbox 1104. Menus selections that can be clicked to reveal cascaded menu options are marked with a triangle 1105, revealing a cascaded drop-down menu 1106 and related web links 1107. Details for people with related expertise 1108 can be accessed and contact made through a number of means, including e-mail, instant message and telephone.

The system provides a web-based survey module (FIG. 10), and/or a facility to retrieve survey results from other software systems and databases. To use the survey module, a master user defines questions that the user will answer, the Key Survey Indicators (KSIs) to which they relate and the weighting of each question in respect of each KSI. A user then provides input to a web form to input survey responses to the questions defined by a master user. The user is offered a rating scale 1001 to questions 1002 to provide their survey responses by clicking on an appropriate selection button 1003. The responses to questions by one or more respondents are aggregated to compute the KSI value which is then traffic lighted (displayed in a colour-coded format) and displayed in the scorecard for those entities. In this case the survey was used by Entity 1, Entity 2 and Entity 3 so the results are shown for all three entities in FIG. 5.

Figure 5:
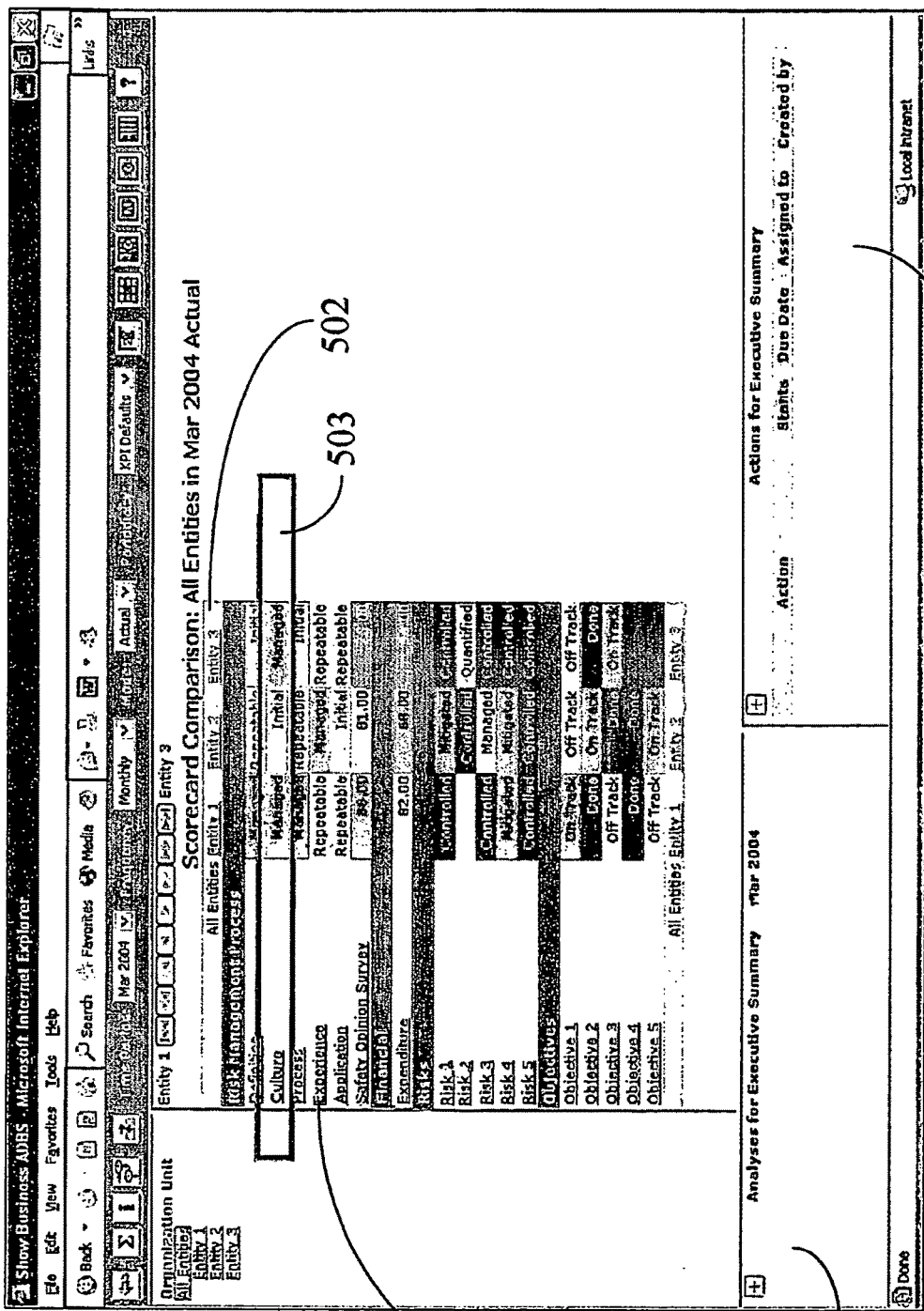
FIG. 5 is a screenshot of an entity comparison screen.

Referring to FIG. 5, to compare the scorecards for different entities and learn from different entities, the user clicks on the button 212. FIG. 5 shows the resulting scorecard for the same Entity, "Entity 1" as FIG. 2, but this time comparing indicators 501 for different entities 502, namely "Entity 2" and "Entity 3", rather than comparing indicators for different time periods.

Since an expert can effectively break down their expertise into useful small pieces using the above approach, their knowledge is re-useable by others. In this respect, by sharing Risk Management scorecards showing the progress of Entities in relation to the Intent of Risk Management, managers in different Entities benchmark and learn from one another. Using the portal screen shown, Entities compare in this example, their progress on implementation Risk Management. The traffic-lighted KTI Culture for each Entity is identified by the grey box 503. Entities can share their experience 504 and their action plans, learnings 505. The Expertise used to define the KTIs is acting used as an effective knowledge filter, to provide users of the web portal with the information they need to address their specific needs to understand and implement Risk Management.

Figure 21:
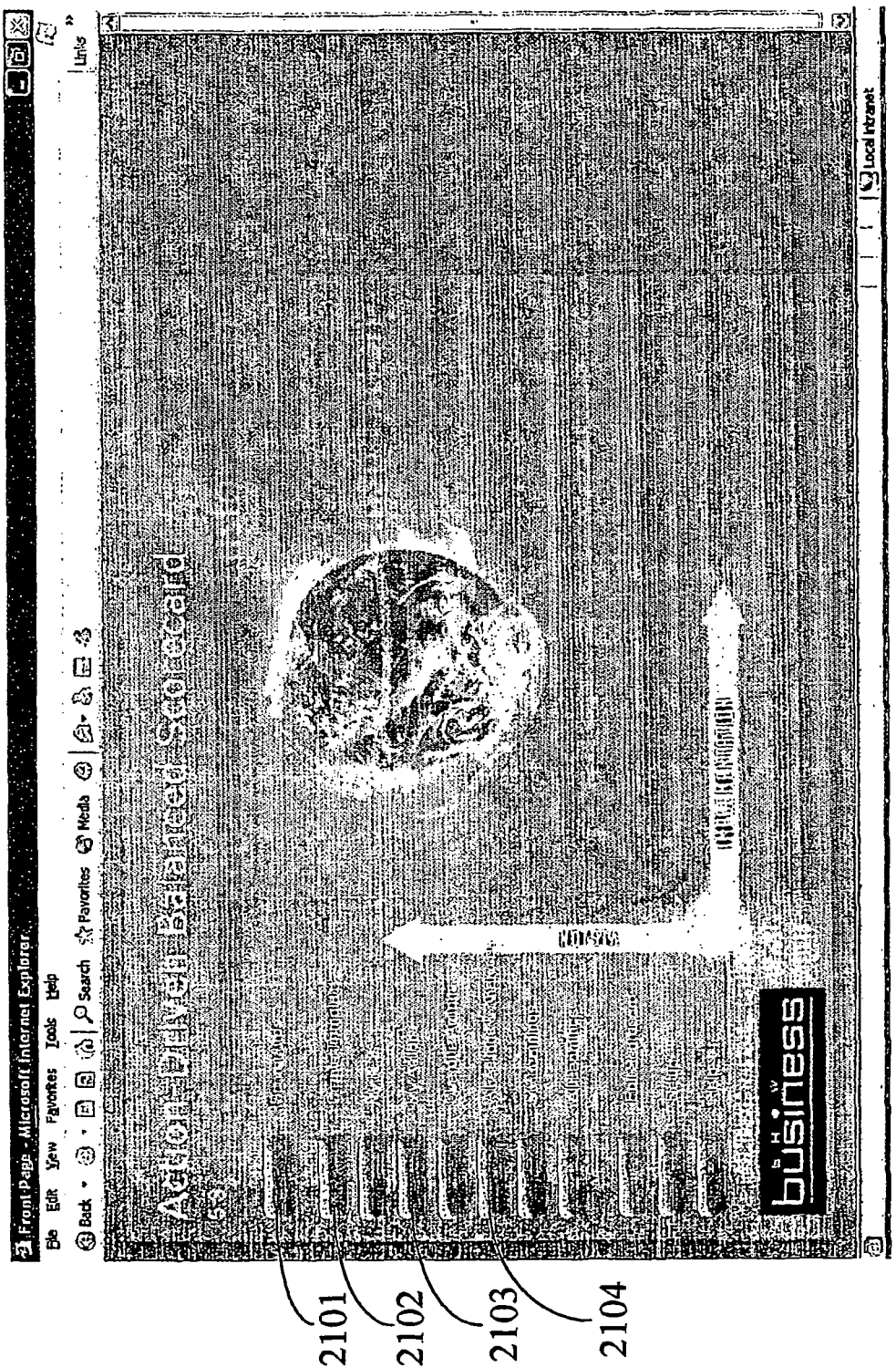
FIG. 21 is a screenshot of a navigation menu.

From the main navigator shown in FIG. 21, the user can select various buttons to see different views of scorecards 2101 or the system's knowledge base, including views to show actions 2103 which displays a screen similar to FIG. 8, analysis 2104 which shows a screen similar to FIG. 9 and learnings. A user can access, by clicking in a frame of the portal or a linked web page, various different selections and categorisations of knowledge generated by use of the system and related to the system some of which are accessible from the buttons 805. The web page in FIG. 8 shows the "My Actions" view for an individual 801 user, which gathers all actions for the active user relating to any Entity 802 or Hierarchy of Intent including the indicator to which each Action relates 803. These Actions are tabulated for ease of review showing status and other summary information for each action. Each action is a link to a further web page, allowing the user to review it in detail or change its status.

Various other screens are accessible from the buttons 905. The web page in FIG. 9 shows the "All Actions And Analysis" view for an individual 901 user, which gathers all Actions and Analysis which the active user has a right to see (in any Entity) presenting a table showing the any Entity 902 or Hierarchy of Intent including the indicator to which each entry relates 903. These Actions and Analysis are tabulated for ease of review showing owner or person responsible 904 and other summary information for each action. Each Action and Analysis is a link to a further web page, allowing the user to review it in detail or change its status.

Returning to the scorecard web portal shown in FIG. 2, which the user can access from the main navigator shown in FIG. 21, a user can also choose to input data from the scorecard web portal. By clicking on the button 212 shown in FIG. 2, a user selects manual data input for the selected KPI, KTI or KSI. FIG. 12 shows the user interface for manual data entry for an indicator 1201. The form provides data entry fields for a number of periods, in this case months 1201. A drop-list 1202 shows the possible step values. The user selects a step value from the drop-list of available values 1203.

The value of a KTI at any time can be set manually based on a user's judgement or automatically based on the state of a process within a system via an automated IT link. For example, Red could designate that an urgent issue with a risk has been idenitified in an ERP risk management workflow system. Blue could designate that the risk has been marked as mitigated in the risk management workflow system.

From the main navigator of the system shown in FIG. 21, the user can select to see a personal to do list of actions by clicking the All My Actions link 2103. FIG. 8 shows the web page displayed by one such link. A user can access, by clicking in a frame of the portal or a linked web page, various different selections and categorisations of knowledge generated by use of the system and related to the system some of which are accessible from the buttons 805. The web page in FIG. 8 shows the "My Actions" view for an individual 801 user, which gathers all actions for the active user relating to any Entity 802 or Hierarchy of Intent including the indicator to which each Action relates 803. These Actions are tabulated for ease of review showing status and other summary information for each action. Each action is a link to a further web page, allowing the user to review it in detail or change its status.

Referring to FIG. 9, a user can access, by clicking in a frame of the portal or a linked web page, various different selections and categorisations of knowledge generated by use of the system and related to the system some of which are accessible from the buttons 905. The web page in FIG. 9 shows the "All Actions And Analysis" view for an individual 901 user, which gathers all Actions and Analysis which the active user has a right to see (in any Entity) presenting a table showing the any Entity 902 or Hierarchy of Intent including the indicator to which each entry relates 903. These Actions and Analysis are tabulated for ease of review showing owner or person responsible 904 and other summary information for each action. Each Action and Analysis is a link to a further web page, allowing the user to review it in detail or change its status.

Risk Management indicators are saved in a library by different master users and combined together in a Template to support the Hierarchy of Intent shown in FIG. 3 and reflected in FIG. 2. The same approach has been used in the following example of developing a Service Improvement Plan and scorecard for a local government organisation.

From the main navigator shown in FIG. 21, a master user can select the Create a Template link 2102 to see the portal shown in FIG. 13. The user can either edit an existing Template or create a new one by clicking on 1305. In the portal shown, a master user defines a Template to capture multiple indicator definitions for re-use in the Template. The Template is defined in a number of sections 1301. The Template can be defined to use language relevant to the purpose of the entity 1302. The workflow completion of each section of the Template can be optionally rated using a KTIs or Step-by-step measures 1303 in which case the details of the Step-by-step measure can be defined by filling out fields 1304. As noted, this Template enables the user to develop an effective Service Improvement Plan.

Referring to FIG. 14, details of an Indicator are defined by a master user. In this case a self-assessment KTI is defined 1401 to allow users to assess the degree to which they have completed the Template correctly and developed a quality Service Improvement Plan. A user of the system can choose to create a Service Improvement Plan, by clicking on the button 1403 to see a list of Improvement Plans in a web portal similar to FIG. 15. The user then clicks on a button to Create an Improvement Plan 1503.

Once defined, FIG. 15 shows how the Template appears to the user who is filling it in. The parameters that were entered by the creator of the template now appear as a part of the user interface to the user. The template as provided to the user is here referred to as an Improvement Plan. 1001 shows the title of the Template that has been defined in the Template definition. 1002 shows how sections in the Improvement Plan are completed.

A user fills in the template within a web-based form or portal in this case to define the Improvement Plan. Text data fields entered into the Template provide the language for the form used for the Service Improvement Plan. In this case, the title is CPA which is a mnemonic for "Comprehensive Performance Assessment" and indicates the purpose of the Template to users 1501. User names and security rights can also be defined by completing the Service Improvement Plan 1502.

Once completed, the Service Improvement Plan defines a Hierarchy of Intent and the user is presented with the option to Create a Scorecard. On clicking this button, the user sees a scorecard web portal similar to FIG. 16.

FIG. 16 shows the scorecard portal generated from the Improvement Plan filled out in FIG. 15 which in turn was created using the Template created in FIGS. 13 and 14 above. Entities for which plans exist are labelled organisation units or scorecards 1601. Additional frames within the portal 1602 and 1603 show associated knowledge related to the selected scorecard since no indicator is selected.

Figure 17:
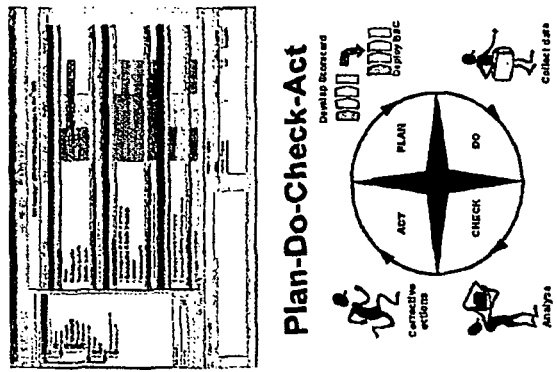
FIG. 17 is a schematic diagram of how a methodology of various management feedback processes can be combined with the scorecard of FIG. 2.

The system is used in conjunction with a quality management feedback management process so that indicators are reviewed regularly and actions taken and stored in the system. Referring to FIG. 17, translating intent of an entity into a scorecard 1701 which may be supported by Coaching 1702, where the system is providing the basis for a structured conversation between coach and person coached including and using a feedback process 1703 of Plan-Do-Check-Act or another known quality management approach to continuous improvement together with a step of learning from experience and recording what is learned, management can effectively drive improvements 1704 and organisational learning. Other approaches to feedback include Plan-Do-Check-Act, Plan-Do-Study-Act, Plan-Do-Review and Plan-Implement-Evaluate, all of the above being known in the field of management and particularly quality management and continuous improvement.

Figure 18:
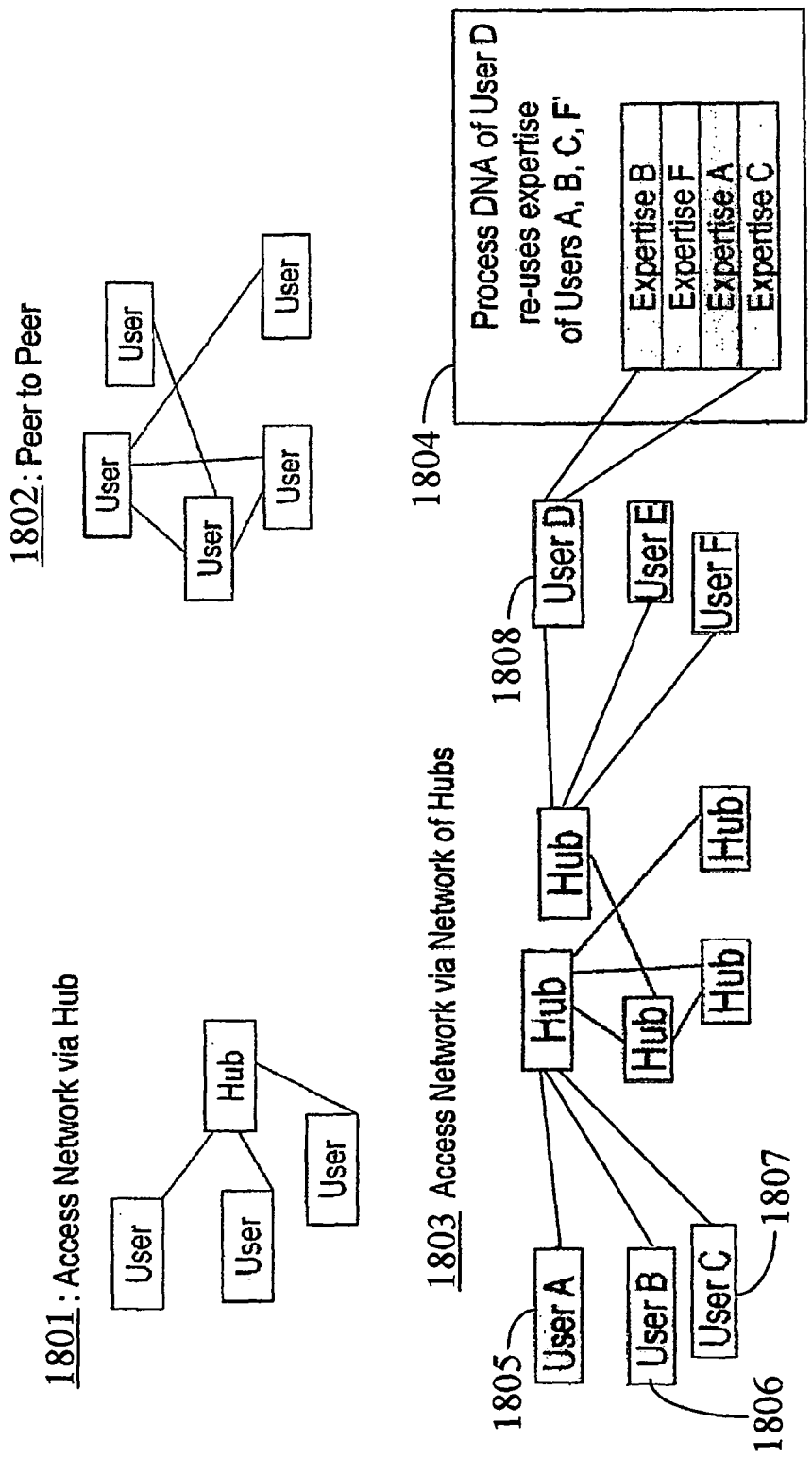
FIG. 18(a) to (c) are schematic diagrams of network architectures for use with the apparatus of FIG. 1.

Referring to FIG. 18, in both the Risk Management and Service Improvement Planning examples shown, expertise is encoded and saved for re-use as templates, scorecards, KPIs, KTIs, KSIs. In this respect, the system makes expertise in Risk Management, for example, accessible by the scorecard portal.

Users share expertise as a combination of indicators and knowledge, also referred to as Process DNA. Using the web portal shown, users can access and share knowledge in a network via a hub (for example a corporate file server) 1801, Peer-to-Peer in the same way as systems like Napster work on the Internet 1802 or via a network of hubs in the same manner, for example, as large corporation uses Lotus Domino to replicate data between regional servers for access via individual users. In this way, a body of Risk Management expertise, or Process DNA is available to User D 1804, generated by Users A 1805, User B 1806 and User C 1807 is available for user.

The Risk Management expertise in the portal is made available as on-line system that can be shared by departments within an organisation or across multiple organisations. Consequently, Peer-to-Peer operation is used by individual users to share their expertise.

From the user's perspective, the web portal screen shown in FIG. 2 appears the same, but Entities displayed in the selection frame 204 can be owned by different users on different physical computers, connected by a peer-to-peer network as shown in FIG. 18.

The following highlights the options for how the data can be accessed, which is important to the utility of the software in connecting experts and users in knowledge sharing communities.

When peer-to-peer configuration is used 1802, any user can opt to share their Risk Management scorecard with any other user directly over the Internet or a network. A user can notify a user of their desire to share content by e-mail, or by electronic request input to a web page or other means.

In the Risk Management scorecard, the owner (or principal or responsible user) of Entity 2 has selected to share their scorecard with the owner of Entity 1, hence the owner of Entity 1 is able to see the scorecard for Entity 2 as shown in FIG. 2.

To request access to a further scorecard, the owner of Entity 1 has several options including use of e-mail. While the owner of Entity 1 knew of the existence of Entity 2, they were unaware of the Existance of Entity 3 until the system identified Entity 3 (using the Purposeful Clustering approach described below) as an appropriate organisation for benchmarking and learning and displayed its name to the owner of Entity 1.

When the owner of Entity 1 tried to access the scorecard of Entity 2 for the first time, they were given the option to request to share their scorecard with the owner Entity 3. They chose to request to share their scorecard with the owner of Entity 3. The owner of Entity 3 was notified that the owner of Entity 1 wanted to share and accepted. The scorecard for Entity 3 was then accessible to the owner of Entity 1. The owner of Entity 3 selected reciprocal sharing (rather than only sharing Entity 3's scorecard, but not seeing the scorecard of Entity 1) and they selected full sharing (as opposed to sharing only some indicators and they selected to share with all users of Entity 1, rather than selecting by role, function, or other criteria.

Again referring to FIG. 18, Entity 1 was aware of the existence of Entity 2 because Entity 1 and 2 had subscribed to a hub providing a central registry for profiles of metadata, consisting of scorecards, KPIs, KTIs, KSIs which defines the Hierarchy of Intent and hence the purpose for subscribing entities. Users, or subscribers to the hub then access benchmark organisations information via the Hub shown schematically in with the linkages of three users to a central hub represented 1802.

Profiles of meta-data from other Entities connected to other hubs are available to Entity 1 through the connections that the hub has with other hubs indicated by 1803.

The benchmark organisations are made available to the owner of Entity 1 based on the match of their meta-data profiles. This match can be set by a master user to be computed by a number of known statistical methods. The simplest, used for identification of Entity 3 is known as least squares and is calculated by computing the sum of squares of differences between normalised and weighted indicator values of each entity. There is a dual weighting in this case, where each indicator is normalised to give a comparable value of between 0 and 1 (according to a function which is a defined property of each indicator) and has a user defined weighted of both importance and priority. In this case, the owner of Entity 1 has selected to have only 1 best matching benchmark organisation identified at a time. (If further organisations were required a more complex function of the system allows the user to view web page showing potential benchmark organisations on a 2 dimensional plot showing the matching of indicators according to importance and urgency on separate axes).

Figure 19:
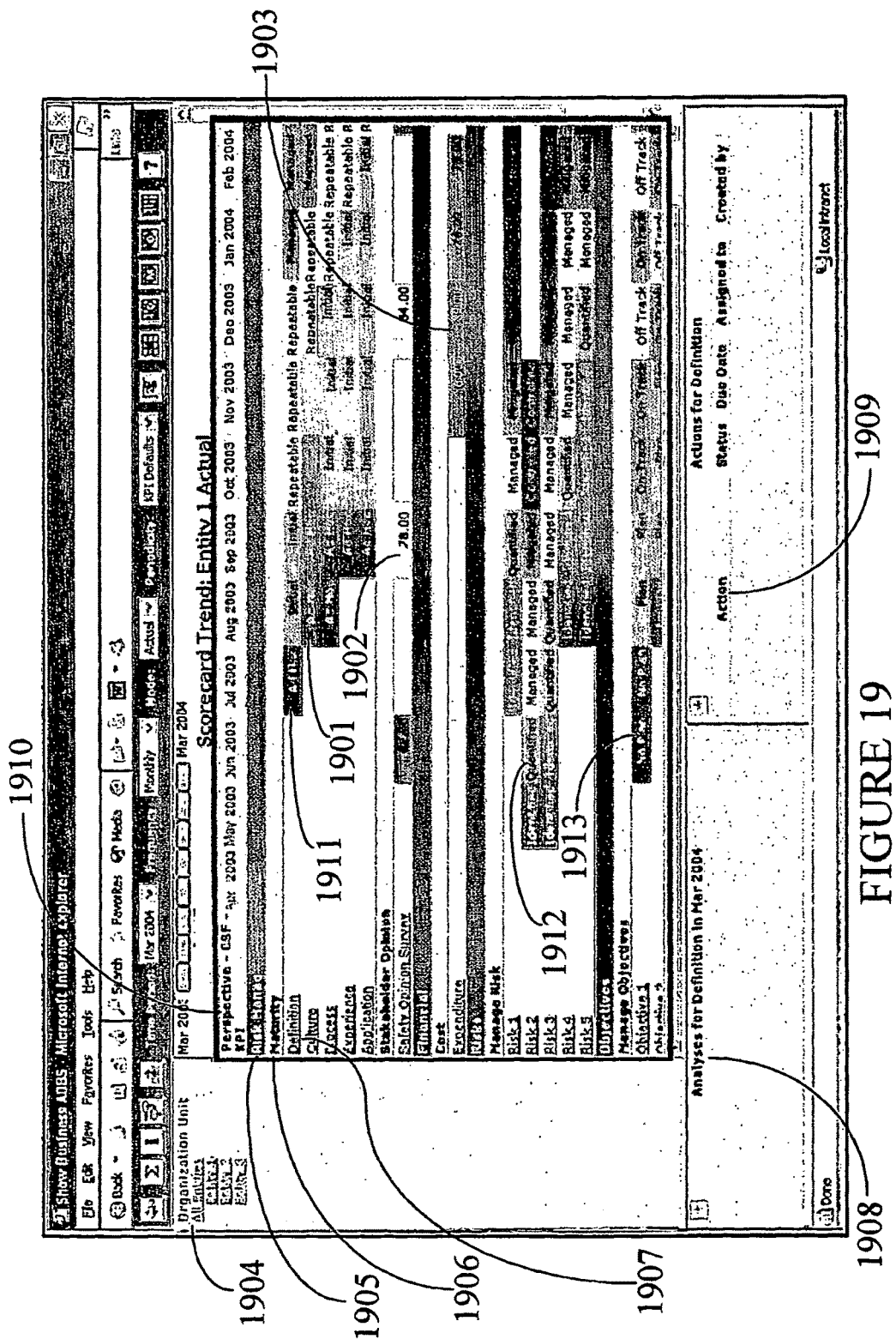
FIG. 19 is a screenshot of the scorecard of FIG. 2 that has evolved in response to system change.

Refusing to FIG. 19, FIG. 19 shows the software in a web portal highlighting the way in which the portal contents depend on the context defined by the scorecard 1910. The scorecard 1910 definition changes as KTIs, KPIs, KSIs reach threshold levels, based on user defined formulae.

Specifically, the scorecard shows High Level Goals 1905, Low Level Goals 1906 and indicators 1907 that are conditionally displayed depending on the previous contents, state or value of the scorecard. The list of Entities 1904 that can be selected depends on the current definition and state or value of the scorecard. Knowledge associated with a selected indicator or Entity displayed in 1908 and 1909 depends on the state of the Entity as represented in the Scorecard 1910.

Figure 20:
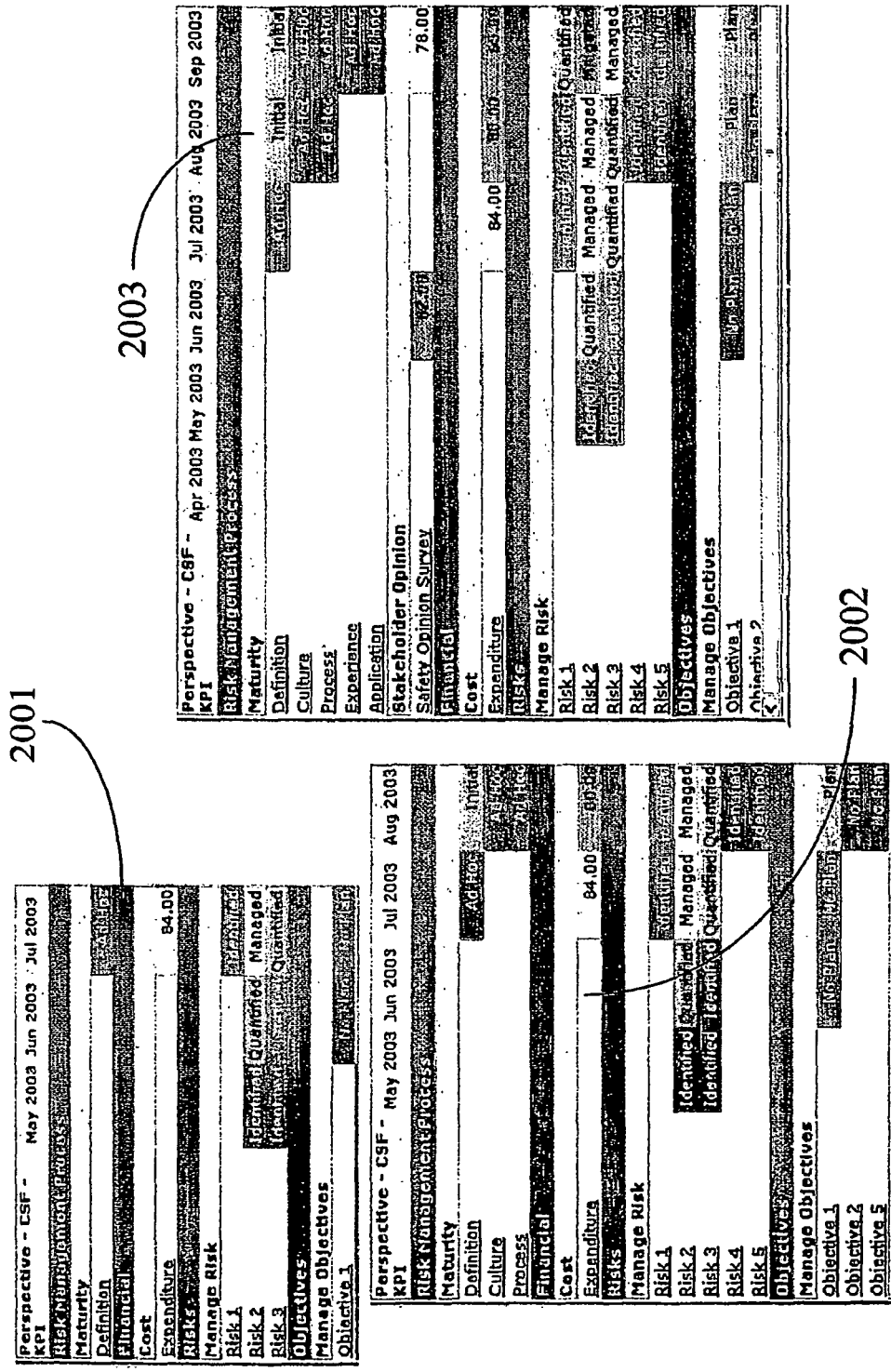
FIG. 20 is a screenshot of a scorecard for sequential months.

While FIG. 19 shows a static screenshot, the contents of the portal has changed over time in response to changes in the system. Snapshots of the scorecard only for July, August and September are shown in FIG. 20.

The KTI Definition was assessed to an Initial level or rating in July, before the system enabled the KTIs for Culture and Process allowing them to be measured in August. The KTIs for Culture and Process were required to be at the Ad Hoc level before the system automatically enabled the KTIs for Experience and Application to be measured from September. In this way, the system helped the user to focus on what was important, based on the experience of the experts who defined the Template and indicators from which the scorecard was defined.

In addition to defining the conditions for enabling KPIs, KTIs and KSIs, the system also provided starting conditions and time delays. As a result, the following instructions were effectively translated into a scorecard:

In Month 1, May, start by identifying one or two key known risks and Enable one or two Risk KTIs, Risk 1 and Risk 2.

In Month 2, June, formalise the objective of implementing Risk Management based on the scorecard and Enable an Objective 1 KTI and start to measure expenditure quarterly by Enabling the Expenditure KPI.

In Month 3, Enable the Definition KTI, then Enable other KTIs according to defined conditions. The conditions used to turn on the Culture, Process, Experience and Application KTIs are represented in human readable form below.

To give an example of an example formula from within the function $f$ above:

IF Definition(t)>=Initial THEN Turn On Culture and Process

IF (Culture(t)>=Ad Hoc AND Process(t)>=Ad Hoc THEN (Enable Experience and Enable Application)

These definitions are associated with indicators and may be combined when an indicators or a Process DNA are combined, saved when it is/are saved and re-used when it is re-used. For simplicity, whenever Indicators or Process DNA are operated on by the current system, the related information to implement the function $f$ to enable and disable indicators or Process DNA is also processed.

The result of these conditions being applied can be seen by referring to FIG. 20, the July scorecard of indicators is shown labelled 2001, the August scorecard of indicators is shown labelled 2002 and the September scorecard of indicators is shown labelled 2003.

Figure 7:
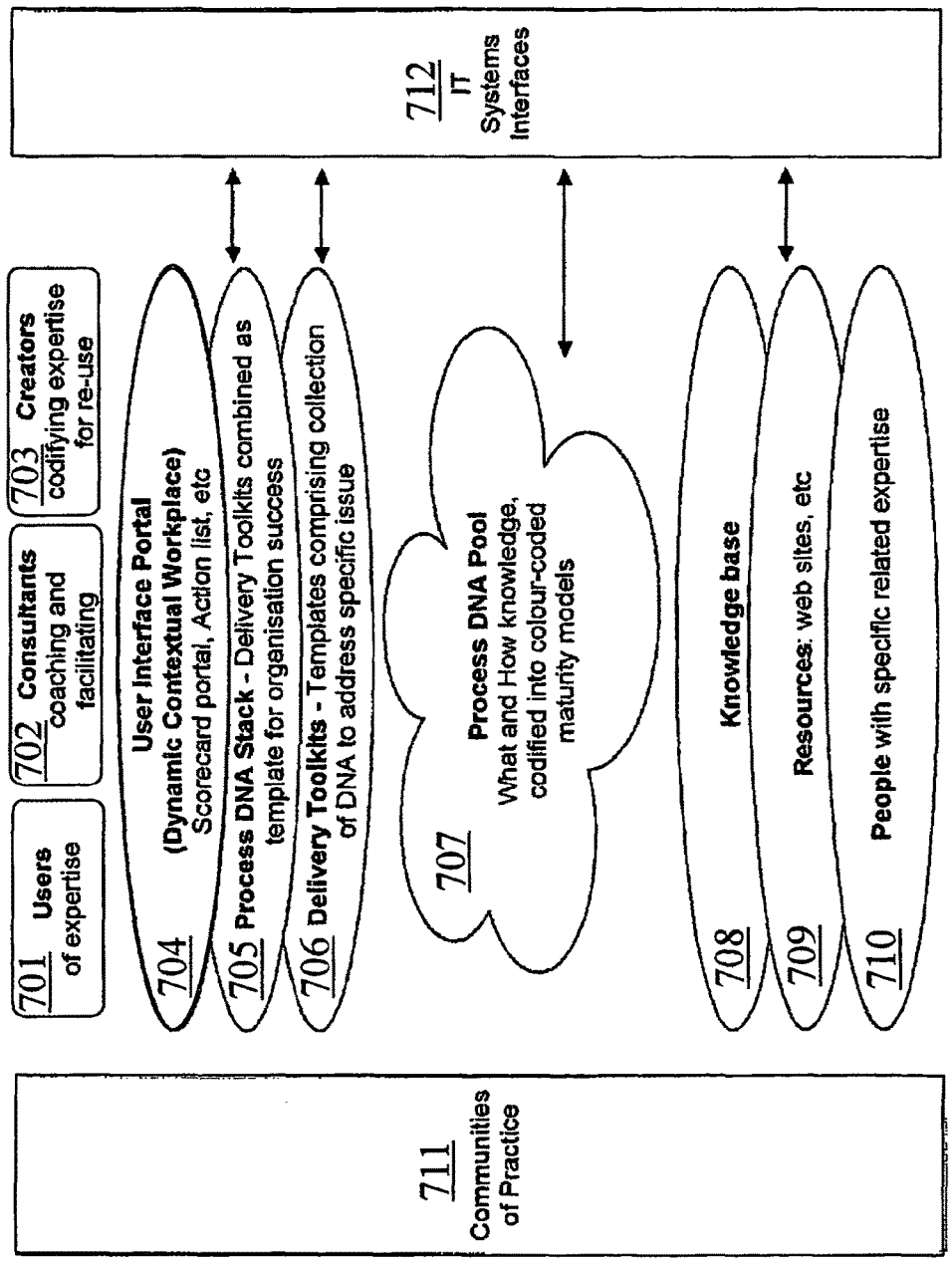
FIG. 7 is a schematic diagram of process DNA and reuse thereof.

Summarising the way the system is used and referring to FIG. 7, the web portal software is used synergistically by a community of groups of users, to share expertise reflected in indicators and knowledge that are combined in a pool of so-called Process DNA Pool 707 with links to a knowledge base 707, resources (web-sites, etc) 708 and people with specific related expertise 710. This Process DNA Pool is used in a variety of Delivery Toolkits 706 each developed as a Template using and with reference to the Process DNA Pool 707. A collection of Delivery Toolkits can be combined to provide a Process DNA Stack 705 that provides a blueprint for the success of an organisation. A User Interface Portal 704 provides user interface to the Process DNA Stack 705, Deliver Toolkits 706 and Process DNA Pool 707. Users 701, Consultants 702 and Creators of expertise for re-use 703 access use the User Interface 704 to interact with the system. Communities of Practice 711 use the system, via the portal, as a means to collaborate. Various IT Systems Interfaces 712 link Resources 709, Process DNA Pool 707, Process DNA Stack 705 and Delivery Toolkits 706 and other aspects of the portal system to data, information, knowledge, workflow and ERP systems, the internet, etc.

Referring to FIGS. 2, 5, 6, 8-16 and 19, the System stores a profile of the user and presents the appropriate style of knowledge presentation and depth of content for the user.

The system generate and maintains its user profile through a combination of: tracking previous user actions, choices, searches, emails, communications etc, as well as from the metadata of a personal scorecard where a personal scorecard is available.

The system stores a profile of the user according to their personal values, objectives, preferred learning style and other preferences, based on their use of the system and manually input preferences and questionnaire responses that indicate that the user is of a Visual learning style and that their preferred language is English. The learning styles available in the user preferences option from the main navigator are: Visual—with predominantly graphical presentation, Auditory—using sound as the principle medium, Kinaesthetic—using the language of feeling and experience, Factual—using the language of logic and analysis.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

The invention claimed is:

1. An organizational management system for providing an electronic user interface to access digital information resources over a computer network, the system comprising:
   an input device;
   a digitized personal profile of a user of the system including security privileges of the user;
   a graphical user interface configured to display an interactive digital scorecard comprising a plurality of indicators organized according to a hierarchy of intent and associated with an entity, wherein a first indicator of the plurality of indicators represents a level of maturity of a process based on a maturity model format that defines a plurality of maturity levels and includes electronic links to associated knowledge; and
   a processor coupled to the input device and the graphical user interface, the processor being configured to:
      provide, responsive to receiving a change to a definition of the maturity model format of the first indicator, an update to the interactive scorecard of the graphical user interface;
      receive a selection of an indicator from the input device at the updated graphical user interface;
      identify, in response to the selected indicator, digital information resources accessed by the electronic links based on the digitized personal profile of the user, the digital information resources providing knowledge associated with the selected indicator; and provide, using the updated graphical user interface, the user with access to the digital information resources, wherein access to the digital information resources is based on the content of the digitized personal profile of the user and the selected indicator.

2. The system of claim 1, wherein at least one of the digital information resources is editable.

3. The system of claim 1, wherein the selected indicator is associated with a checklist.

4. The system of claim 3, wherein the checklist includes a condition of satisfaction and a link list, and wherein the condition of satisfaction includes its own list of URL links.

5. The system of claim 1,
wherein the selected indicator is characterized by one of a plurality of color-coded states, and
wherein the graphical user interface is further configured to update a color of the first indicator to correspond to a change of state of the indicator resulting from the user selection.

6. The system of claim 1, wherein the graphical user interface is arranged to display information comprising items that are associated with the selected indicator, and wherein an item of information is accessible in response to a selection of the item of information.

7. The system of claim 1, wherein the selected indicator comprises a Key Transformation Indicator (KTI).

8. The system of claim 7, wherein knowledge is codified into a plurality of KTIs comprising color coded maturity models.

9. The system of claim 1,
wherein the information associated with the selected indicator provides access to a source of information, and
wherein the selected indicator comprises meta-data for performing a search.

10. The system of claim 9, wherein the meta-data includes a color of the indicator.

11. The system of claim 9, wherein the source of information is a knowledge base such that when the same indicator is used repeatedly in a plurality of entities, knowledge created by users of the indicator for one entity and stored in the knowledge base is accessible by users of the same indicator for another entity.

12. The system of claim 9, wherein the source of information is a knowledge base.

13. The system of claim 1, wherein the first indicator changes state in response to a change in state of another indicator.

14. The system of claim 1, wherein the selected indicator comprises a data structure definition associating the selected indicator with a community of practice.

15. The system of claim 1, wherein the selected indicator comprises a data structure definition associating the selected indicator with the user and a mode of communication for communicating with the user.

16. The system of claim 1, wherein the digital information resources identify expertise data, and the processor is further configured to:
allow selection of the digital information resources in order to access the expertise data.

17. The system of claim 1, further comprising:
a server coupled to the processor, wherein the server is arranged to receive the digitized personal profile and parse a plurality of available interactive digital scorecards in order to identify at least one of the plurality of interactive digital scorecards that is most relevant to the digitized personal profile, and
wherein the at least one of the plurality of interactive digital scorecards has a plurality of indicators and content associated therewith, and the server is capable of delivering at least part of the content associated with the at least one of the plurality of interactive digital scorecards to a recipient terminal associated with the digitized personal profile.

18. The system of claim 17, wherein the system generates and stores the digitized personal profile, the stored digitized personal profile being accessible to the processor, and the processor determines which of a plurality of available interactive digital scorecards and respective indicators are to be displayed.

19. The system of claim 18, wherein the system maintains the stored digitized personal profile through tracking previous user actions and choices.

20. The system of claim 19, wherein the system maintains the stored digitized personal profile through tracking searches or emails or communications.

21. The system of claim 1,
wherein information associated with the selected indicator provides access to a source of information, and
wherein the selected indicator comprises meta-data for performing a clustering.

22. The system of claim 1,
wherein information associated with the selected indicator provides access to a source of information, and
wherein the selected indicator comprises meta-data for performing a comparison.

23. The system of claim 1,
wherein information associated with the selected indicator provides access to a source of information, and
wherein the selected indicator comprises meta-data for performing a selection of information.

24. The system of claim 1,
wherein information associated with the selected indicator provides access to a source of information, and
wherein the selected indicator comprises meta-data for performing a selection of entities.

25. The system of claim 1, wherein the processor is further configured to:
generate at least one updated indicator in response to at least one of the plurality of indicators changing state; and
identify digital information resources based on the at least one updated indicator.

26. The system of claim 1, wherein the electronic links connect to at least one of a person, contact, user, URL, knowledge base, learning resource, and community of practice.

27. The system of claim 1, wherein the electronic links include details for people with related expertise including email, instant message, and telephone contact information.

28. The system of claim 1,
wherein the processor is further configured to:
generate a profile vector based on the digitized personal profile;
wherein the processor identifies the digital information resources by using a weighted match of the profile vector with the digital information resources; and wherein the access to the digital information resources is based on the content of the digitized personal profile of the user, the weighted match of the profile vector, and the selected indicator.

29. The system of claim 28, wherein the weighted match of the profile vector is determined using a numerical representation of a priority or urgency of a respective value of the profile vector.

* * * * *